(12) United States Patent
Duke

(10) Patent No.: US 10,071,371 B2
(45) Date of Patent: Sep. 11, 2018

(54) COMPOSITIONS AND METHODS FOR REDUCING ATMOSPHERIC OZONE LEVELS

(71) Applicant: Air Cross, Inc., San Diego, CA (US)

(72) Inventor: Christopher Duke, San Diego, CA (US)

(*) Notice: Subject to any disclaimer, the term of this patent is extended or adjusted under 35 U.S.C. 154(b) by 0 days.

(21) Appl. No.: 15/614,250

(22) Filed: Jun. 5, 2017

(65) Prior Publication Data

US 2017/0320052 A1    Nov. 9, 2017

Related U.S. Application Data

(63) Continuation of application No. 14/821,710, filed on Aug. 8, 2015, now Pat. No. 9,669,401.

(60) Provisional application No. 62/034,864, filed on Aug. 8, 2014.

(51) Int. Cl.
*B01J 41/12* (2017.01)
*B01J 41/13* (2017.01)
*B01D 53/66* (2006.01)

(52) U.S. Cl.
CPC .............. *B01J 41/12* (2013.01); *B01D 53/66* (2013.01); *B01J 41/13* (2017.01); *B01D 2251/21* (2013.01)

(58) Field of Classification Search
CPC ........... B01J 41/12; B01J 41/13; B01D 53/66; B01D 2251/21

USPC ......................................................... 423/219
See application file for complete search history.

(56) References Cited

U.S. PATENT DOCUMENTS

| | | | | |
|---|---|---|---|---|
| 4,328,337 A * | 5/1982 | Kawasaki | ............. | C08F 120/28 536/115 |
| 4,336,356 A * | 6/1982 | Aharoni | ................... | C08C 19/04 525/331.7 |
| 4,673,707 A * | 6/1987 | Tsai | ........................ | C07H 15/26 525/54.2 |
| 2011/0087046 A1* | 4/2011 | Frey | ........................ | C07C 67/08 560/183 |
| 2012/0183594 A1* | 7/2012 | Glenn | ...................... | A01G 7/06 424/443 |

FOREIGN PATENT DOCUMENTS

| | | | | |
|---|---|---|---|---|
| CH | 557445 A5 * | 5/1976 | ............. | C07C 47/20 |
| FR | 1617845 A1 * | 7/1887 | ............... | C07G 1/00 |
| GB | BP 592254 * | 8/1942 | | |

* cited by examiner

*Primary Examiner* — Michael M Bernshteyn
(74) *Attorney, Agent, or Firm* — Gendloff IP; Elie Gendloff

(57) ABSTRACT

Provided are ozone decomposing compositions comprising a solvent and a polymer. The polymer comprises a structural repeat unit comprising an unsubstituted or substituted carbohydrate moiety. Also provided are methods of decomposing ozone using the compositions, and spray coatings, items of clothing, fabrics, carpets, paints, sealants, finishes, air-filters, face-masks, cosmetics, creams, lotions and coatings incorporating the polymer.

18 Claims, No Drawings

COMPOSITIONS AND METHODS FOR REDUCING ATMOSPHERIC OZONE LEVELS

CROSS-REFERENCE TO RELATED APPLICATIONS

This application is a continuation of prior application Ser. No. 14/821,710, filed Aug. 8, 2015, now U.S. Pat. No. 9,669,401B2, which claims the benefit of U.S. Provisional Application Ser. No. 62/034,864 filed on Aug. 8, 2014, entitled "COMPOSITIONS AND METHODS FOR REDUCING ATMOSPHERIC OZONE LEVELS," the entire disclosure of which is incorporated herein by reference.

FIELD OF THE INVENTION

The present disclosure is in the field of compositions and methods for controlling air pollution; and more particularly, the invention relates to compositions and methods for reducing ozone levels.

BACKGROUND OF THE INVENTION

Ozone is formed in the atmosphere by the action of sunlight, ultraviolet light or an electrical discharge such as lightning on oxygen in the air. It is also formed when an electrical apparatus produces sparks in the air.

Ozone in the air may be toxic to human beings and animals. According to Occupational Safety and Health Administration (OSHA), the permissible maximal average concentration of ozone in the air should be no more than 0.1 ppm when breathing air. Many apparatuses for industrial use are manufactured in accordance with these standards. Ozone has a characteristic odor, which is noticeable even at concentrations as low as 0.01 to 0.02 ppm. When the concentration of ozone increases to about 0.05 ppm, it has an unpleasant odor; and when the concentration exceeds 0.1 ppm, it is irritating to the mucous membranes of the eyes and respiratory organs. Ozone is also a powerful oxidizing agent which oxidizes and deteriorates organic materials. Therefore, it is desirable that the concentration of ozone be kept as low as possible.

Ozone is used in industry for the sterilization, deodorization and decolorization of water and for the treatment of raw sewage. These applications often require the use of ozone in concentrations as high as 500-2500 ppm. For example, to sterilize water, 1 to 3 g of ozone is bubbled into 1 cubic meter of water. Most of the ozone blown into water is decomposed, however, some of the residual ozone can be discharged from the water into the air. Since the concentration of the discharged ozone in the air may be as high as 1 ppm, it is necessary to decompose the discharged ozone before it spreads into the air for the safety to human beings and for the protection of the environment.

Since ozone is toxic to human beings when its concentration in the air is high, various methods have been proposed to decrease its concentration. For example, filters made of activated carbon and filters containing various catalysts, such as metal oxides of manganese, copper, silver and cobalt, have been employed for decomposing ozone. If the density of the materials in these filters is high, the absorption of ozone and its decomposition efficiency is increased. However, the higher density of these materials slows the flow rate of the air through the filter. By contrast, if the density of the materials in the filter is decreased, the absorption of ozone and the ozone decomposition efficiency are decreased.

Various polymers and terpenoid compounds have also been used to control ozone levels. For example, a rubber olefin polymer containing double bond groups has been used for decomposing ozone generated from an electrophotographic copying machine. Terpenoid compounds capable of decomposing ozone, such as linalool, linalool ester, citral and the like, in various solutions and gels have also been used. In addition, paints containing a variety of organic materials have been proposed. However, the decomposition efficiency is not high enough for use in practice. Furthermore, the by-products formed after decomposition of the ozone has not been fully characterized in these cases. Therefore, it is unclear whether exposure to these by-products affect a person's health, and whether there are any negative environmental impacts.

Therefore, there remains a need in the art for new compounds, compositions and methods for removing and/or controlling ozone levels without having a negative impact on humans, animals and the environment, wherein the by-products formed after decomposition of the ozone is safe and fully characterized.

SUMMARY OF THE INVENTION

Disclosed herein are ozone reactive polymers comprising a structural repeat unit represented by the following formula XLI:

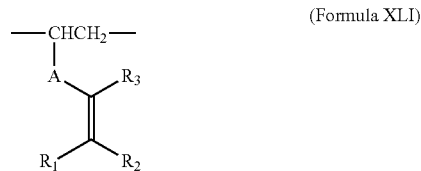

(Formula XLI)

wherein A is absent or a linking group selected from the group consisting of substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, substituted or unsubstituted arylalkylene, and substituted or unsubstituted heteroarylalkylene; each of $R_1$, $R_2$ and $R_3$ is, independently, selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein said structural repeat unit comprises at least 10% by weight of said polymer.

The present invention also provides an ozone decomposing composition comprising a solvent and a polymer of the present invention.

Further disclosed herein are methods of decomposing ozone comprising contacting ozone with an ozone decomposing composition of the present invention.

DETAILED DESCRIPTION OF THE INVENTION

Unless otherwise defined, scientific and technical terms used in connection with the disclosure shall have the meanings that are commonly understood by those of ordinary skill in the art. Further, unless otherwise required by context, singular terms shall include pluralities and plural terms shall include the singular. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses, chemical analyses, formulations, and delivery.

Abbreviations used herein have their conventional meaning within the chemical and biological arts.

Where substituent groups are specified by their conventional chemical formulae, written from left to right, they equally encompass the chemically identical substituents that would result from writing the structure from right to left, e.g., —OCH$_2$— is equivalent to —CH$_2$O—.

The term "alkyl" by itself or as part of another substituent, means, unless otherwise stated, a straight unbranched or branched chain, or a cyclic hydrocarbon radical, or a combination thereof, which may be fully saturated, mono- or polyunsaturated and can include di- and multivalent radicals having the number of carbon atoms designated, e.g. $C_1$-$C_{10}$ means one to ten carbons. Examples of saturated alkyl groups include, but are not limited to, groups such as methyl, ethyl, n-propyl, isopropyl, n-butyl, sec-butyl, isobutyl, t-butyl, n-pentyl, n-hexyl, n-heptyl, n-octyl, cyclopropyl, cyclobutyl, cyclopentyl, cyclohexyl, (cyclohexyl)methyl, cyclopropylmethyl and the like. An unsaturated alkyl group is one having one or more double bonds or triple bonds, i.e. alkenyl and alkynyl groups. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the like.

The term "alkylene" by itself or as part of another substituent means a divalent radical derived from an alkyl group, i.e. alkyl, alkenyl and alkynyl groups, as exemplified, but not limited, by —CH$_2$CH$_2$CH$_2$CH$_2$—, —CH$_2$CH═CHCH$_2$—, —CH$_2$C≡C—CH$_2$—, —CH$_2$CH$_2$CH(CH$_2$CH$_2$CH$_3$)CH$_2$—. In one embodiment, an alkyl or alkylene group has 1 to 24 carbon atoms. In another embodiment, an alkyl or alkylene group has 1 to 10 carbon atoms. A "lower alkyl" or "lower alkylene" group is a shorter chain alkyl or alkylene group, generally having one to six carbon atoms.

The term "carboxyl" or "carboxylate," by itself or in combination with another term contemplates a functional group containing carbon double bonded to one oxygen molecule and single bonded to another oxygen molecule. Common carboxyl or carboxylate groups have structures "—C(═O)O—" or OC(═O)— and "—OC(═O)O—" or —OC(═O)O—. Common carboxylate functional groups include but are not limited to carboxylic acids and esters.

The term "heteroalkyl," by itself or in combination with another term contemplates a stable straight or branched chain, or cyclic hydrocarbon radical, or combinations thereof, consisting of at least one carbon atom and at least one heteroatom selected from O, N, P, Si and S. As used herein, the term "heteroatom" or "ring heteroatom" is meant to include oxygen (O), nitrogen (N), sulfur (S), phosphorus (P), and silicon (Si). The N, P and S atoms may optionally be oxidized and the nitrogen heteroatom may optionally be quaternized. The heteroatom(s) O, N, P, S and Si may be placed at any interior position of the heteroalkyl group or at the position at which alkyl group is attached to the remainder of the molecule. Examples of heteroalkyl groups include, but are not limited to, —CH$_2$CH$_2$OCH$_3$, —CH$_2$CH$_2$NHCH$_3$, —CH$_2$CH$_2$N(CH$_3$)CH$_3$, —CH$_2$SCH$_2$CH$_3$, —CH$_2$CH$_2$—, —S(O)CH$_3$, —CH$_2$CH$_2$S(O)$_2$CH$_3$, —CH═CHOCH$_3$, —Si(CH$_3$)$_3$, —CH$_2$CH═NOCH$_3$, —CH═CHN(CH$_3$)CH$_3$, —O—CH$_3$, —OCH$_2$CH$_3$, and —CN. Up to two or three heteroatoms may be consecutive, such as, for example, —CH$_2$NHOCH$_3$ and —CH$_2$OSi(CH$_3$)$_3$.

The term "heteroalkylene" by itself or as part of another substituent contemplates a divalent radical derived from heteroalkyl, as exemplified, but not limited by, —CH$_2$CH$_2$SCH$_2$CH$_2$— and —CH$_2$SCH$_2$CH$_2$NHCH$_2$—. For heteroalkylene groups, heteroatoms can also occupy either or both of the chain termini, e.g., alkyleneoxo, alkylenedioxo, alkyleneamino, alkylenediamino, and the like. Still further, for alkylene and heteroalkylene linking groups, no orientation of the linking group is implied by the direction in which the formula of the linking group is written. For example, the formula —C(O)OR'— represents both —C(O)OR'— and —R'OC(O)—.

Heteroalkyl groups, as used herein, include those groups that are attached to the remainder of the molecule through a heteroatom, such as —C(O)R', —C(O)NR', —NR'R", —OR', —SR', and/or —SO$_2$R'. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl groups include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl groups include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. The terms "cycloalkylene" and "heterocycloalkylene" refer to the divalent derivatives of cycloalkyl and heterocycloalkyl, respectively.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_6$)alkyl" is meant to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, hydrocarbon substituent which can be a single ring or multiple rings (preferably from 1 to 3 rings) which are fused together or linked covalently. The term "heteroaryl" refers to aryl groups (or rings) that contain from one to four heteroatoms (in each separate ring in the case of multiple rings) selected from N, O, and S, wherein the nitrogen and sulfur atoms are optionally oxidized, and the nitrogen atom(s) are optionally quaternized. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl3-quinolyl, and 6-quinolyl. Substituents for each of above noted aryl and heteroaryl ring systems are selected from the group of acceptable substituents described below. The terms "arylene" and "heteroarylene" refer to the divalent radicals of aryl and heteroaryl, respectively.

For brevity, the term "aryl" when used in combination with other terms, e.g., aryloxo, arylthioxo, arylalkyl, includes both aryl and heteroaryl rings as defined above. Thus, the term "arylalkyl" is meant to include those radicals in which an aryl group is attached to an alkyl group, e.g., benzyl, phenethyl, pyridylmethyl and the like, including those alkyl groups in which a carbon atom, e.g., a methylene group, has been replaced by, for example, an oxygen atom, e.g., phenoxymethyl, 2-pyridyloxymethyl, 3-(1-naphthyloxy)propyl, and the like.

Where a heteroalkyl, heterocycloalkyl, or heteroaryl includes a specific number of members, e.g. "3 to 7 membered," the term "member" refers to a carbon or heteroatom.

The term "oxo" as used herein means an oxygen that is double bonded to a carbon atom.

Each of above terms, e.g., "alkyl," "heteroalkyl," "cycloalkyl, and "heterocycloalkyl," "aryl," "heteroaryl" as well as their divalent radical derivatives, are meant to include both substituted and unsubstituted forms of the indicated radical. Preferred substituents for each type of radical are provided below.

Substituents for alkyl, heteroalkyl, cycloalkyl, heterocycloalkyl monovalent and divalent derivative radicals, including those groups referred to as alkylene, alkenyl, heteroalkylene, heteroalkenyl, alkynyl, cycloalkyl, heterocycloalkyl, cycloalkenyl, and heterocycloalkenyl, can be one or more of a variety of groups selected from, but not limited to: —OR', =O, =NR', =NOR', —NR'R", —SR', -halogen, —SiR'R"R"', —OC(O)R', —C(O)R', —CO$_2$R', —C(O)NR'R", —OC(O)NR'R", —NR"C(O)R', —NR'C(O)NR"R'", —NR"C(O)OR', —NRC(NR'R"R"')=NR"", —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted alkyl, alkoxy or thioalkoxy groups, or arylalkyl groups.

When a compound of the disclosure includes more than one R group, for example, each of the R groups is independently selected as are each R', R", R'" and R"" groups when more than one of these groups is present. When R' and R" are attached to the same carbon or nitrogen atom, they can be combined with the carbon or nitrogen atom to form a 4-, 5-, 6-, or 7-membered ring. For example, —NR'R" is meant to include, but not be limited to, 1-pyrrolidinyl and 4-morpholinyl.

Similar to the substituents described for alkyl radicals above, exemplary substituents for aryl and heteroaryl groups as well as their divalent derivatives, are varied and are selected from, for example: halogen, —OR', —NR'R", —SR', -halogen, —SiR'R"R"', —OC(O)R', —C(O)R', —CO$_2$R', —C(O)NR'R", —OC(O)NR'R", —NR"C(O)R', —NR'C(O)NR"R"', —NR"C(O)OR', —NRC(NR'R"R"')=NR"", —NRC(NR'R")=NR"', —S(O)R', —S(O)$_2$R', —S(O)$_2$NR'R", —NRSO$_2$R', —CN, —NO$_2$, —N$_3$, —CH(Ph)$_2$, fluoro(C$_1$-C$_6$)alkoxo, and fluoro(C$_1$-C$_6$)alkyl, in a number ranging from zero to the total number of open valences on aromatic ring system. In some embodiments, R', R", R'" and R"" are independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl.

The term "polymer" as used herein contemplates a molecule comprising of one or more distinct types of structural repeat units. The term "polymer" as used herein is inclusive of "oligomer," "copolymer," "homopolymer" and like terms commonly known in the art. In some embodiments, the polymer is a cyclic polymer. In one embodiment, the cyclic polymer is cyclodextrin.

As used herein, the terms "repeat unit," "structural unit," and "structural repeat unit" are used interchangeably and will be understood to mean the constitutional repeating unit (CRU), which is the smallest constitutional unit the repetition of which constitutes a regular macromolecule, a regular oligomer molecule, a regular block or a regular chain. As further used herein, the term "unit" will be understood to mean a structural unit which can be a repeating unit on its own, or can together with other units form a constitutional repeating unit.

The polymers and compounds disclosed herein may exist as salts. Examples of applicable salt forms include hydrochlorides, hydrobromides, sulfates, methanesulfonates, nitrates, maleates, acetates, citrates, fumarates, tartrates (eg (+)-tartrates, (−)-tartrates or mixtures thereof including racemic mixtures), succinates, benzoates and salts with amino acids such as glutamic acid. These salts may be prepared by methods known to those skilled in art. Also included are base addition salts such as sodium, potassium, calcium, ammonium, organic amino, or magnesium salt, or a similar salt. When polymers of the present disclosure contain relatively basic functionalities, acid addition salts can be obtained by contacting the neutral form of such compounds with a sufficient amount of the desired acid, either neat or in a suitable inert solvent. Examples of acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like.

The neutral forms of the polymer or compound may be regenerated by contacting the salt with a base or acid and isolating the parent compound in the conventional manner. The parent form of the polymer differs from the various salt forms in certain physical properties, such as solubility in polar solvents.

The polymers and compounds disclosed herein can exist in unsolvated forms as well as solvated forms, including hydrated forms. In general, the solvated forms are equivalent to unsolvated forms and are encompassed within the scope of the present disclosure. The polymers disclosed herein may exist in multiple crystalline or amorphous forms. In general, all physical forms are equivalent for the uses contemplated by the present disclosure and are intended to be within the scope of the present disclosure.

The polymers and compounds disclosed herein may possess asymmetric carbon atoms (optical or chiral centers) or double bonds; the enantiomers, racemates, diastereomers, tautomers, geometric isomers, stereoisometric forms that may be defined, in terms of absolute stereochemistry, as (R)- or (S)- or, as (D)- or (L)- for amino acids, and individual isomers are encompassed within the scope of the present disclosure. The present disclosure includes compounds in racemic and optically pure forms. Optically active (R)- and (S)-, or (D)- and (L)-isomers may be prepared using chiral synthons or chiral reagents, or resolved using conventional techniques. When the polymers disclosed herein contain olefinic bonds or other centers of geometric asymmetry, and unless specified otherwise, it is intended that the compounds include both E and Z geometric isomers. The term "tautomer," as used herein, refers to one of two or more structural isomers which exist in equilibrium and which are readily converted from one isomeric form to another. It will be apparent to one skilled in the art that certain compounds described herein may exist in tautomeric forms, all such tautomeric forms of the compounds being within the scope of the invention.

Unless otherwise stated, structures depicted herein are also meant to include all stereo-chemical forms of the structure; i.e., the R and S configurations for each asymmetric center. Therefore, single stereochemical isomers as well as enantiomeric and diastereomeric mixtures of the present compounds are within the scope of the invention.

The terms "a," or "an," when used in reference to a group of substituents herein, mean at least one. For example, where a compound is substituted with "an" alkyl or aryl, the compound is optionally substituted with at least one alkyl and/or at least one aryl. Moreover, where a moiety is substituted with an R substituent, the group may be referred to as "R-substituted." Where a moiety is R-substituted, the moiety is substituted with at least one R substituent and each R substituent is optionally different.

As used herein, the term "about," when referring to a value or to an amount of mass, weight, time, volume, concentration or percentage is meant to encompass variations of ±20% or ±10%, more preferably ±5%, even more preferably ±1%, and still more preferably ±0.1% from the specified amount, as such variations are appropriate to perform the disclosed method.

The polymers of the present disclosure are within the principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

In one aspect, the present invention provides polymers capable of decomposing atmospheric ozone. The present invention also provides compositions comprising a solvent and an ozone decomposing polymer of the present invention, and methods of decomposing ozone by contacting ozone with a polymer or composition of the present invention.

Ozone is a triatomic molecule composed of three oxygen atoms. It is formed from diatomic oxygen ($O_2$) by the action of sunlight, ultraviolet light or an electrical discharge. Scheme 1 illustrates the resonance structures of triatomic ozone ($O_3$).

Scheme 1

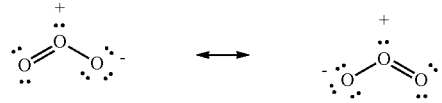

Ground level ozone pollution is created by the action of sunlight's ultraviolet rays on pollutants such as methane. An increase in ground level ozone levels can lead to respiratory problems (asthma and bronchitis and other lung diseases) and/or cause cardiopulmonary problems (heart attack). Long term exposure to ozone has been shown to increase the risk of death. In addition, high levels of ozone in the atmosphere destroy the integrity of many elastomeric products found in tires, such as natural rubber, polybutadiene, styrene-butadiene, and nitrile rubber, in a process known as "ozone-cracking."

Nitrogen oxides ($NO_x$) in the atmosphere also react with volatile organic compounds in the air to form ozone in sunlight. The generated ozone can react with other things, such as plants or rubber to produce more volatile organic compounds. These volatile compounds are released into the air and ultimately produce more ozone. The polymers described here are designed to decompose ozone, and stop this process.

In a second aspect, the present invention provides ozone decomposing compounds of Formula I, Formula II, or Formula III:

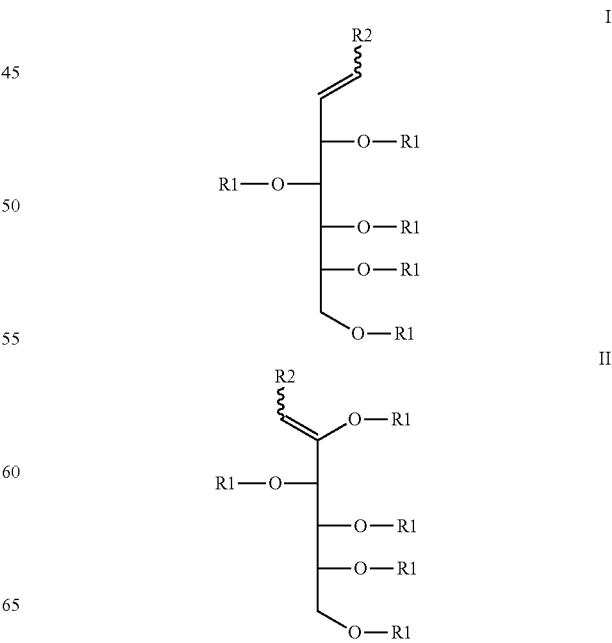

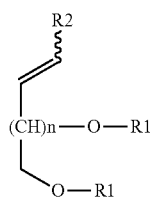

and salts and solvates thereof, wherein:

n is an integer from 1-10, and each $R^1$ and $R^2$ is independently hydrogen, substituted or unsubstituted alkyl, substituted or unsubstituted perfluoroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, substituted or unsubstituted heteroarylalkyl, substituted or unsubstituted —$(CH_2)_j CN$, substituted or unsubstituted —$(CH_2)_j OR^3$, substituted or unsubstituted —$(CH_2)_j C(O)R^3$, substituted or unsubstituted —$(CH_2)_j OC(O)R^4$, substituted or unsubstituted —$(CH_2)_j C(O)OR^3$, substituted or unsubstituted —$(CH_2)_j OC(O)OR^3$, substituted or unsubstituted —$(CH_2)_j NR^5 R^6$, substituted or unsubstituted —$(CH_2)_j C(O)NR^5 R^6$, substituted or unsubstituted —$(CH_2)_j OC(O)NR^5 R^6$, substituted or unsubstituted —$(CH_2)_j NR^5 C(O)R^4$, substituted or unsubstituted —$(CH_2)_j NR^5 C(O)OR^3$, substituted or unsubstituted —$(CH_2)_j NR^5 C(O)NR^5 R^6$, substituted or unsubstituted —$(CH_2)_j S(O)_m R^7$, substituted or unsubstituted —$(CH_2)_j NR^4 S(O)_m R^7$, or substituted or unsubstituted —$(CH_2)_j S(O)_m NR^5 R^6$, wherein each j is independently an integer from 0 to 6; each m is independently an integer from 0 to 2; each n is independently an integer from 0 to 4; or each $R^1$ is as described above, and each $R^2$ is independently an acrylic monomer or polymer, an alkyd monomer or polymer, an epoxy monomer or polymer, a vinyl monomer or polymer or a cellulose monomer or polymer;

$R^3$ is independently hydrogen, or substituted or unsubstituted alkyl;

$R^4$ and $R^7$ are each independently hydrogen, or substituted or unsubstituted alkyl;

$R^5$ and $R^6$ are each independently hydrogen, substituted or unsubstituted alkyl, or $R^5$ and $R^6$, together with the N atom to which they are attached, form a 5- or 6-membered heterocyclic ring or a 5-membered heteroaryl ring; and wherein each $R^1$, $R^2$, $R^3$, $R^4$, $R^5$, $R^6$, and $R^7$ group is optionally independently substituted with 1-3 substituents, each independently selected from alkyl, alkenyl, alkynyl, alkoxy, cycloalkyl, perfluoroalkyl, amide, amino, alkylamino, carboxylate, cyano, dialkylamino, halogen, hydroxyl, imino, nitro, oxo, sulfide, and thiol.

In one embodiment the present invention provides an ozone decomposing compound of Formula VII, Formula VIII, or Formula IX:

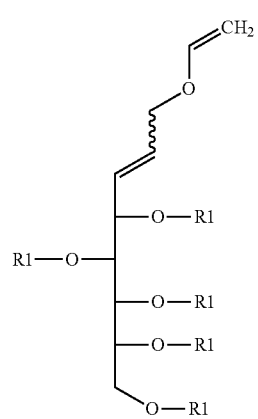

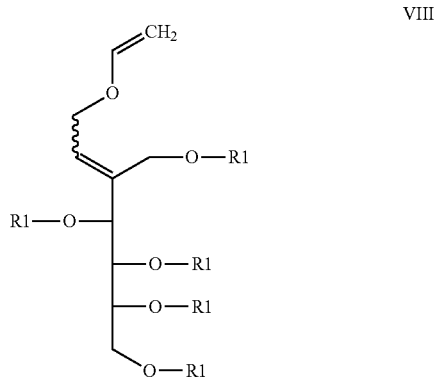

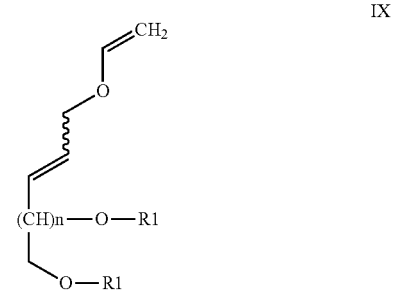

wherein each $R_1$ and n is as defined above.

In another aspect, the present invention provides an ozone decomposing composition comprising a solvent and a polymer comprising a structural repeat unit of Formula X, Formula XI, or Formula XII, wherein the polymer decomposes ozone:

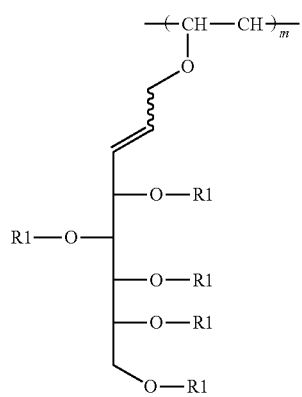

X

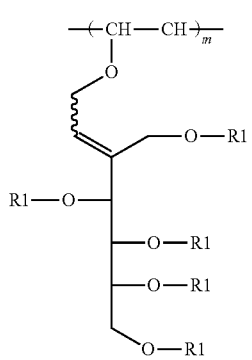

XI

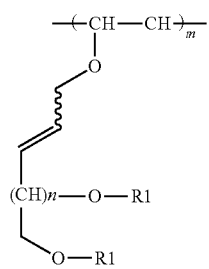

XII

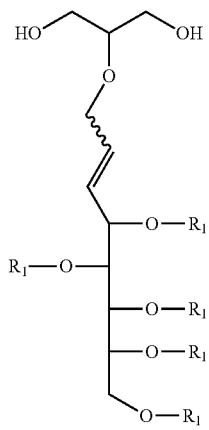

XIII

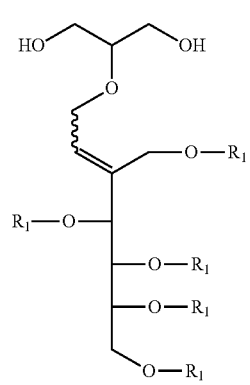

XIV

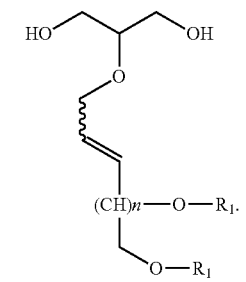

XV wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides an ozone decomposing compound of Formula XIII, Formula XIV, or Formula XV:

wherein n is an integer from 1-10; and each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl.

In another aspect, the present invention provides ozone decomposing compositions comprising a solvent and a polymer comprising a structural repeat unit of Formula XVI, Formula XVII, or Formula XVIII:

XVI

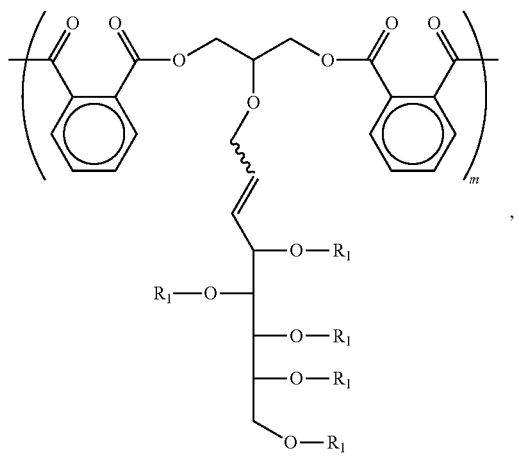

XVII

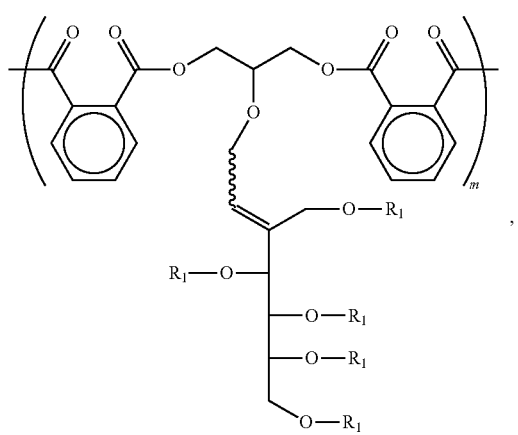

XVIII

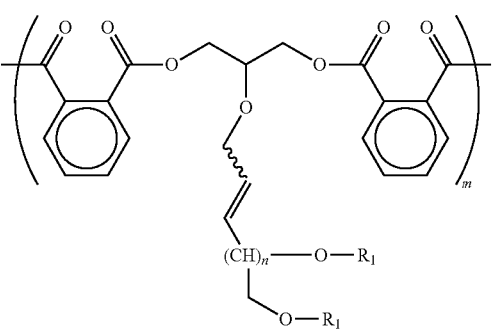

wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides ozone decomposing compositions comprising a solvent and a polymer comprising a structural repeat unit of Formula XIX, Formula XX, or Formula XXI:

XIX

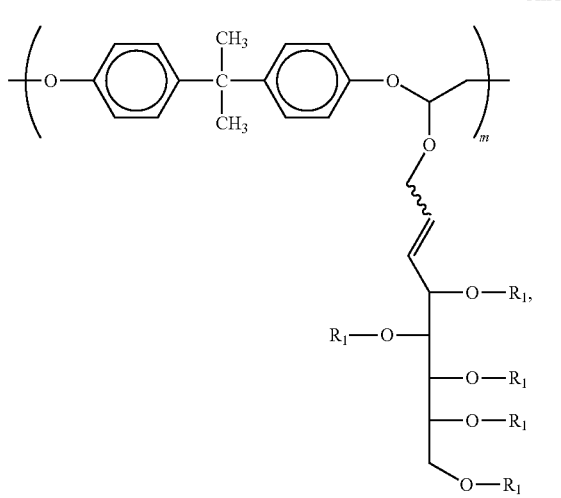

XX

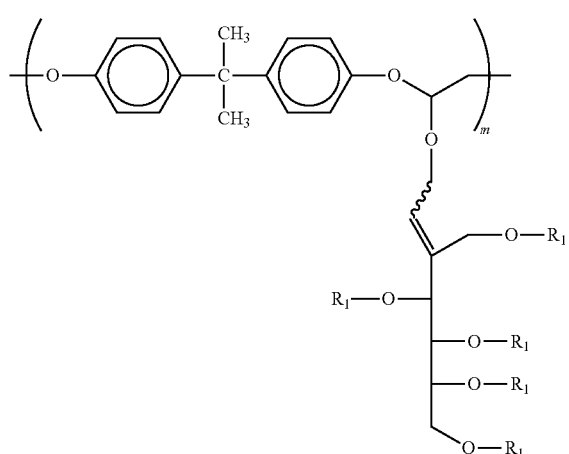

XXI

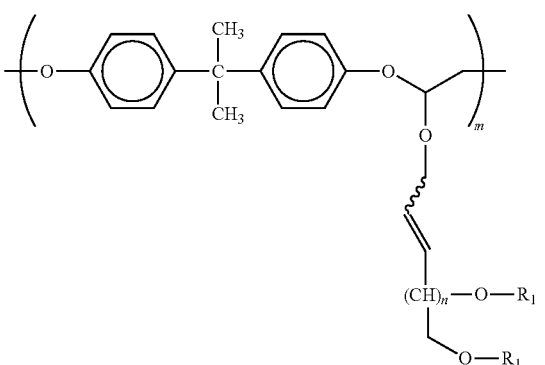

wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides ozone decomposing compositions comprising a solvent and a polymer comprising a structural repeat unit of Formula XXII, Formula XXIII, or Formula XXIV:

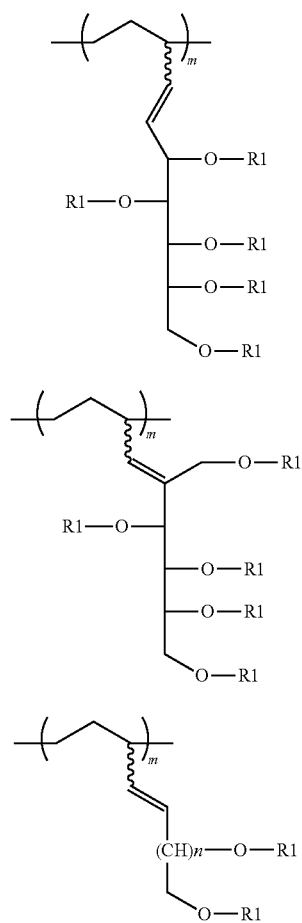

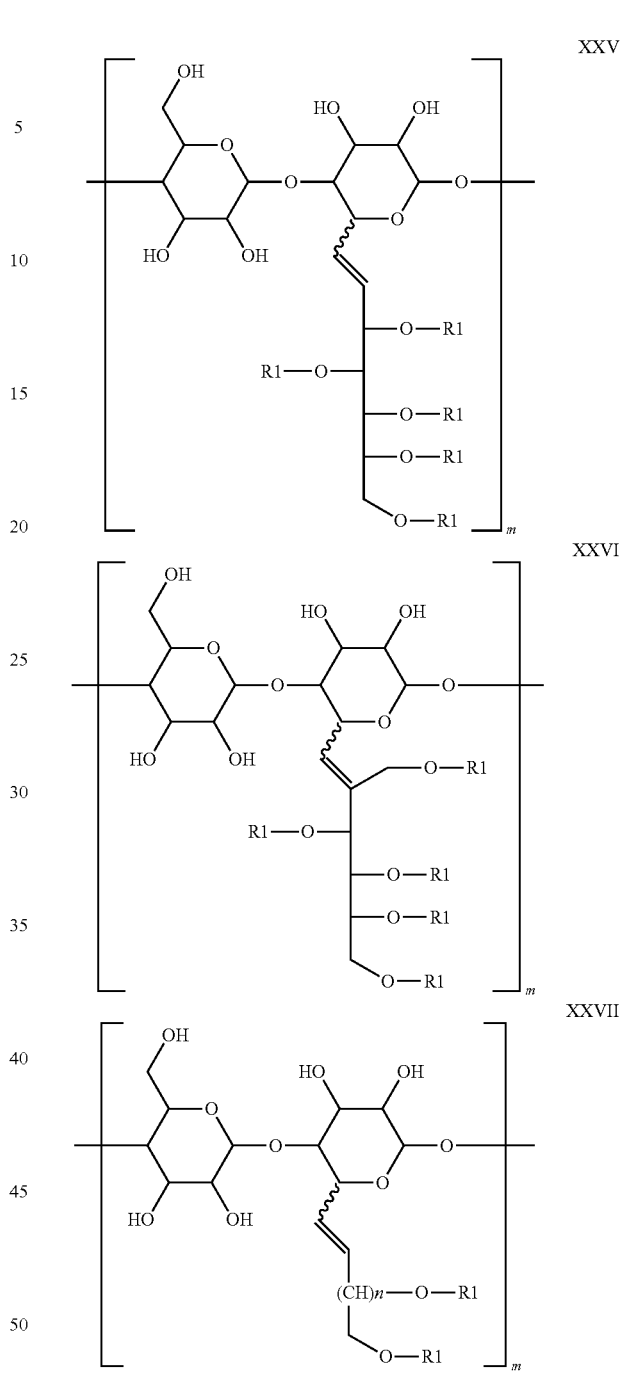

wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides ozone decomposing compositions comprising a solvent and a polymer comprising a structural repeat unit of Formula XXV, Formula XXVI, or Formula XXVII:

wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides ozone decomposing compositions comprising a solvent and a polymer comprising a structural repeat unit of Formula XXVIII, Formula XXIX, or Formula XXX:

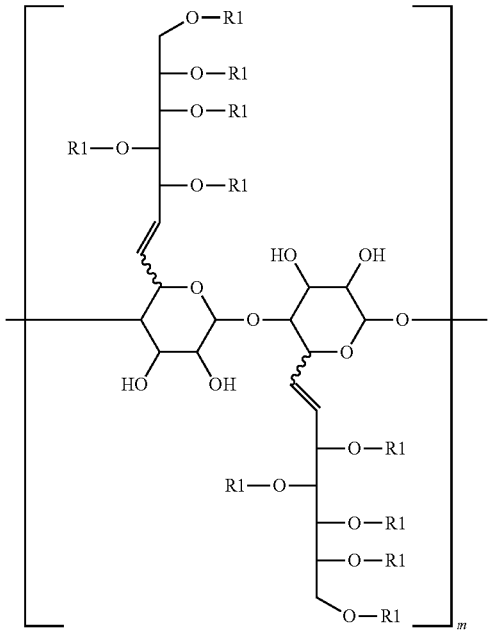

XXVIII

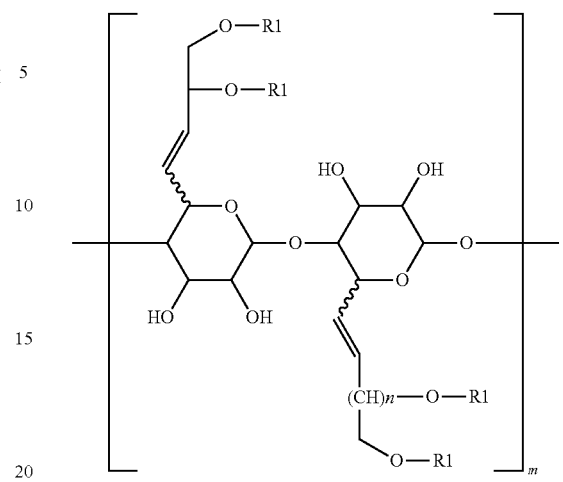

XXX wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides ozone decomposing compositions comprising a solvent and a polymer comprising a structural repeat unit of Formula XXXI, Formula XXXII, or Formula XXXIII:

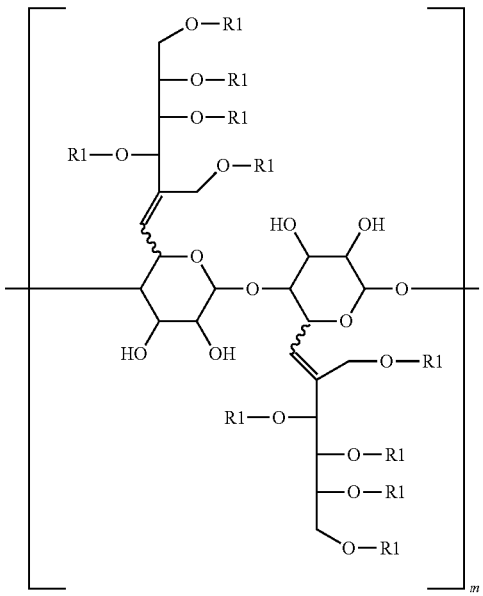

XXIX

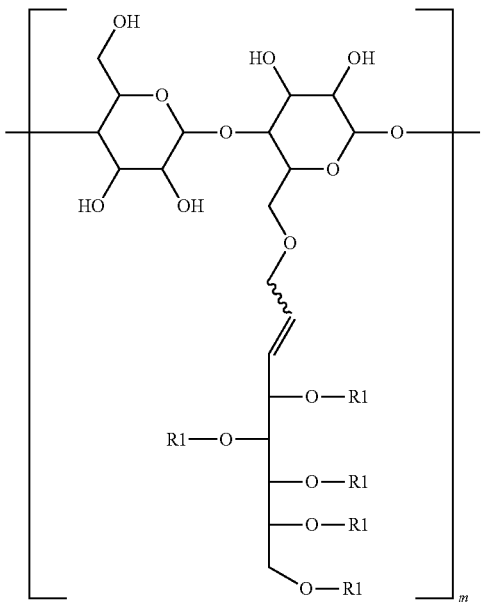

XXXI

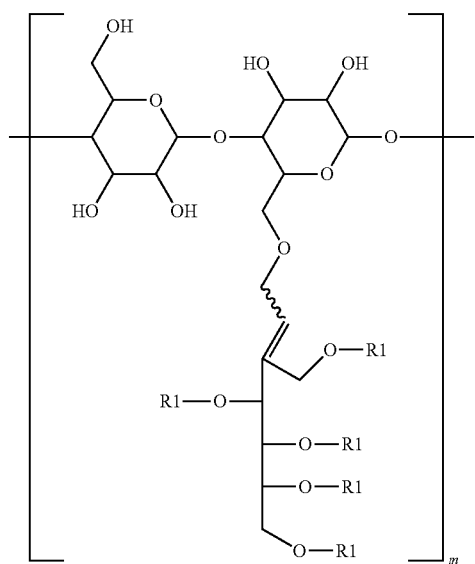

XXXII

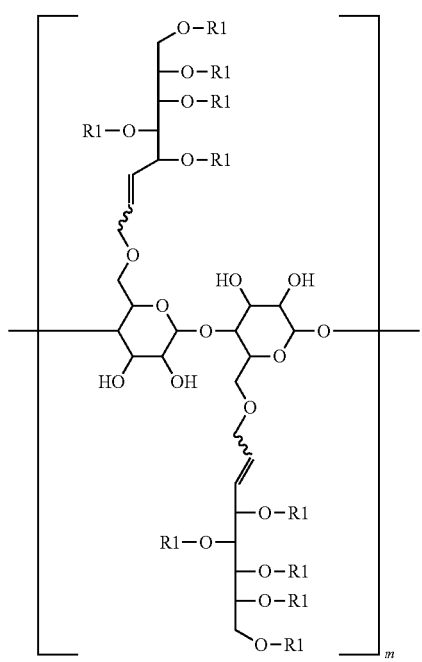

XXXIV

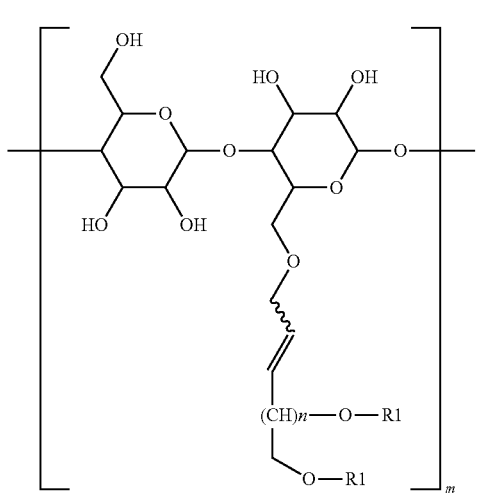

XXXIII

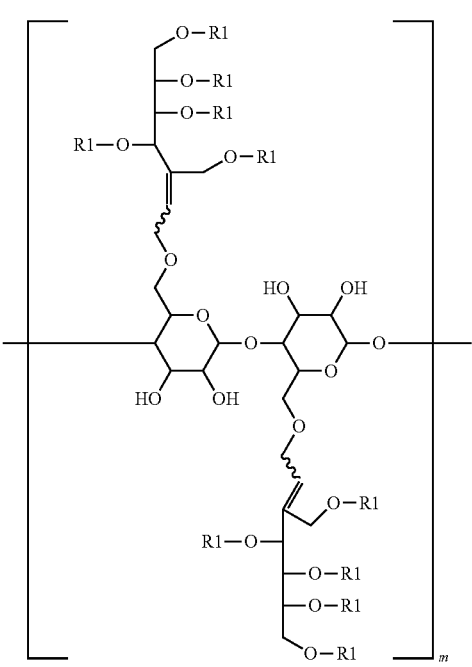

XXXV wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides ozone decomposing compositions comprising a solvent and a polymer comprising a structural repeat unit of Formula XXXIV, Formula XXXV, or Formula XXXVI:

XXXVI

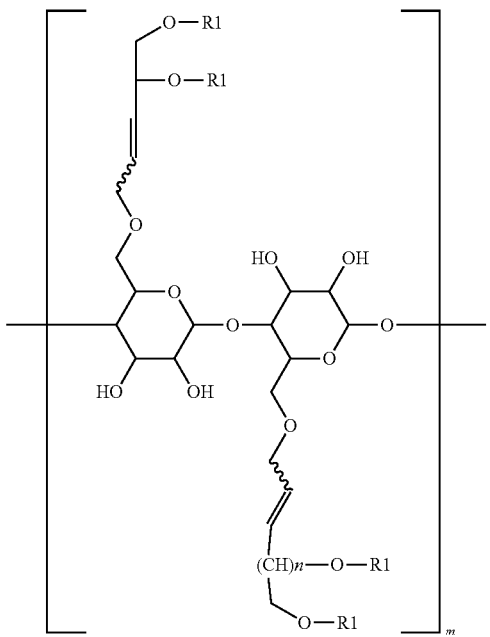

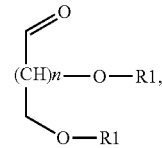
VI wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides compounds of Formula IV, Formula V, or Formula VI:

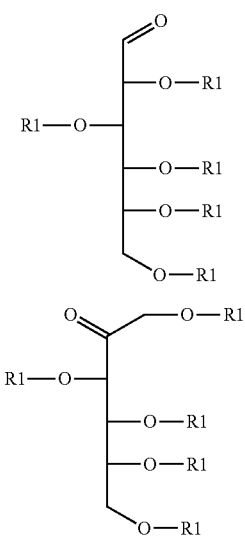
IV

V and salts and solvates thereof, wherein:

n is an integer from 1-10, and each $R^1$ and $R^2$ is independently hydrogen, substituted or unsubstituted alkyl, substituted or unsubstituted perfluoroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, substituted or unsubstituted heteroarylalkyl, substituted or unsubstituted $-(CH_2)_jCN$, substituted or unsubstituted $-(CH_2)_jOR^3$, substituted or unsubstituted $-(CH_2)_jC(O)R^3$, substituted or unsubstituted $-(CH_2)_jOC(O)R^4$, substituted or unsubstituted $-(CH_2)_jC(O)OR^3$, substituted or unsubstituted $-(CH_2)_jOC(O)OR^3$, substituted or unsubstituted $-(CH_2)_jNR^5R^6$, substituted or unsubstituted $-(CH_2)_jC(O)NR^5R^6$, substituted or unsubstituted $-(CH_2)_jOC(O)NR^5R^6$, substituted or unsubstituted $-(CH_2)_jNR^5C(O)R^4$, substituted or unsubstituted $-(CH_2)_jNR^5C(O)OR^3$, substituted or unsubstituted $-(CH_2)_jNR^5C(O)NR^5R^6$, substituted or unsubstituted $-(CH_2)_jS(O)_mR^7$, substituted or unsubstituted $-(CH_2)_jNR^4S(O)_mR^7$, or substituted or unsubstituted $-(CH_2)_jS(O)_mNR^5R^6$, wherein each j is independently an integer from 0 to 6; each m is independently an integer from 0 to 2; each n is independently an integer from 0 to 4; or each $R^1$ is as described above, and each $R^2$ is independently an acrylic monomer or polymer, an alkyd monomer or polymer, an epoxy monomer or polymer, a vinyl monomer or polymer or a cellulose monomer or polymer;

$R^3$ is independently hydrogen, or substituted or unsubstituted alkyl;

$R^4$ and $R^7$ are each independently hydrogen, or substituted or unsubstituted alkyl;

$R^5$ and $R^6$ are each independently hydrogen, substituted or unsubstituted alkyl, or $R^5$ and $R^6$, together with the N atom to which they are attached, form a 5- or 6-membered heterocyclic ring or a 5-membered heteroaryl ring; and wherein each $R^1$, $R^2$, $R^3$, $R^4$, $R^5$, $R^6$, and $R^7$ group is optionally independently substituted with 1-3 substituents, each independently selected from alkyl, alkenyl, alkynyl, alkoxy, cycloalkyl, perfluoroalkyl, amide, amino, alkylamino, carboxylate, cyano, dialkylamino, halogen, hydroxyl, imino, nitro, oxo, sulfide, and thiol.

In another aspect, the present invention provides methods for decomposing ozone by contacting ozone with an ozone decomposing compound of Formula I, Formula II, or Formula III:

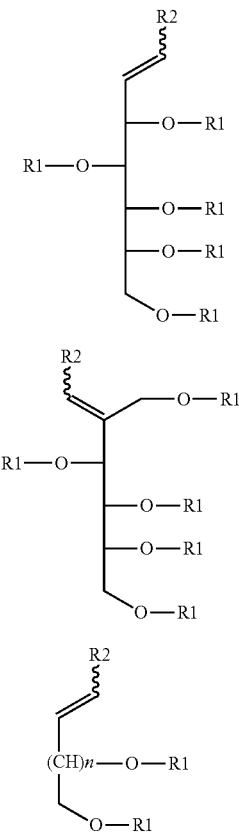

I

II

III or a salt or solvate thereof, wherein:

n is an integer from 1-10; and $R^1$ and $R^2$ are each independently hydrogen, substituted or unsubstituted alkyl, substituted or unsubstituted perfluoroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, substituted or unsubstituted heteroarylalkyl, substituted or unsubstituted —$(CH_2)_j$CN, substituted or unsubstituted —$(CH_2)_j$OR$^3$, substituted or unsubstituted —$(CH_2)_j$C(O)R$^3$, substituted or unsubstituted —$(CH_2)_j$OC(O)R$^4$, substituted or unsubstituted —$(CH_2)_j$C(O)OR$^3$, substituted or unsubstituted —$(CH_2)_j$OC(O)OR$^3$, substituted or unsubstituted —$(CH_2)_j$NR$^5$R$^6$, substituted or unsubstituted —$(CH_2)_j$C(O)NR$^5$R$^6$, substituted or unsubstituted —$(CH_2)_j$OC(O)NR$^5$R$^6$, substituted or unsubstituted —$(CH_2)_j$NR$^5$C(O)R$^4$, substituted or unsubstituted —$(CH_2)_j$NR$^5$C(O)OR$^3$, substituted or unsubstituted —$(CH_2)_j$NR$^5$C(O)NR$^5$R$^6$, substituted or unsubstituted —$(CH_2)_j$S(O)$_m$R$^7$, substituted or unsubstituted —$(CH_2)_j$NR$^4$S(O)$_m$R$^7$, or substituted or unsubstituted —$(CH_2)_j$S(O)$_m$NR$^5$R$^6$, wherein each j is independently an integer from 0 to 6; each m is independently an integer from 0 to 2; each n is independently an integer from 0 to 4; or each $R^1$ is as described above, and each $R^2$ is independently an acrylic monomer or polymer, an alkyd monomer or polymer, an epoxy monomer or polymer, a vinyl monomer or polymer or a cellulose monomer or polymer;

$R^3$ is independently hydrogen, or substituted or unsubstituted alkyl;

$R^4$ and $R^7$ are each independently hydrogen, or substituted or unsubstituted alkyl;

$R^5$ and $R^6$ are each independently hydrogen, substituted or unsubstituted alkyl, or $R^5$ and $R^6$, together with the N atom to which they are attached, form a 5- or 6-membered heterocyclic ring or a 5-membered heteroaryl ring; and wherein each $R^1$, $R^2$, $R^3$, $R^4$, $R^5$, $R^6$, and $R^7$ group is optionally independently substituted with 1-3 substituents, each independently selected from alkyl, alkenyl, alkynyl, alkoxy, cycloalkyl, perfluoroalkyl, amide, amino, alkylamino, carboxylate, cyano, dialkylamino, halogen, hydroxyl, imino, nitro, oxo, sulfide, and thiol.

In one embodiment of this aspect, the present invention provides methods for decomposing ozone by contacting ozone with an ozone decomposing compound of Formula VII, Formula VIII, or Formula IX:

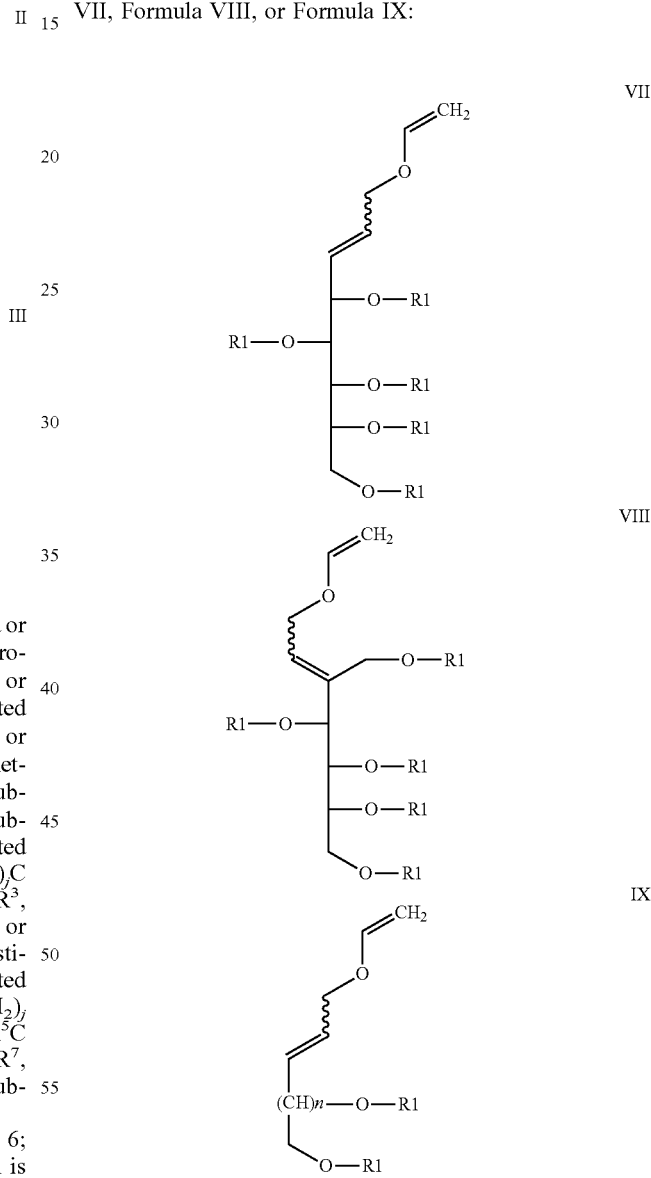

wherein each $R_1$ and n is as defined above.

In another aspect, the present invention provides methods for decomposing ozone comprising contacting ozone with an ozone decomposing composition, wherein said composition comprises a solvent and a polymer comprising a structural repeat unit of Formula X, Formula XI, or Formula XII:

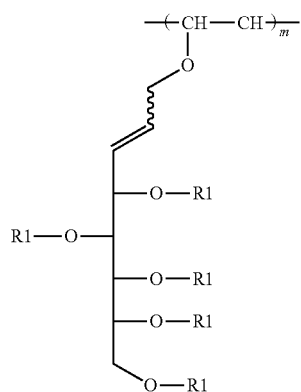

X

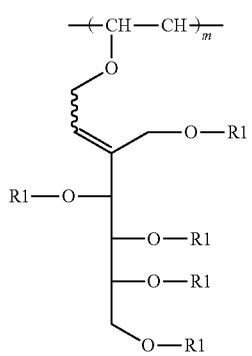

XI

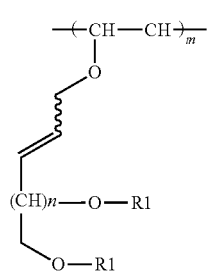

XII

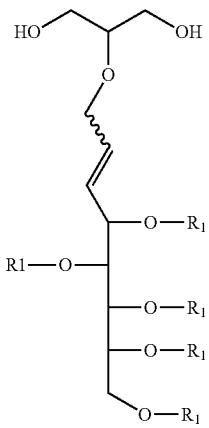

XIII

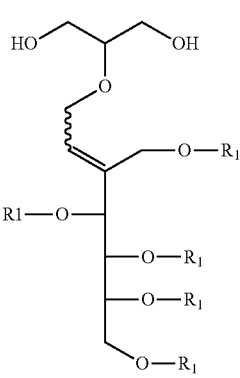

XIV

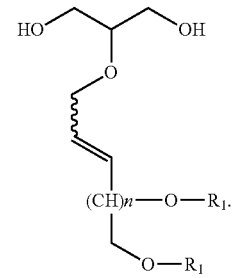

XV wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another embodiment, the present invention provides methods for decomposing ozone by contacting ozone with an ozone decomposing compound, wherein the compound has Formula XIII, Formula XIV, or Formula XV:

wherein n is an integer from 1-10; and each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl.

In another aspect, the present invention provides methods for decomposing ozone comprising contacting ozone with an ozone decomposing composition, wherein said decomposing composition comprises a solvent and a polymer comprising a structural repeat unit of Formula XVI, Formula XVII, or Formula XVIII:

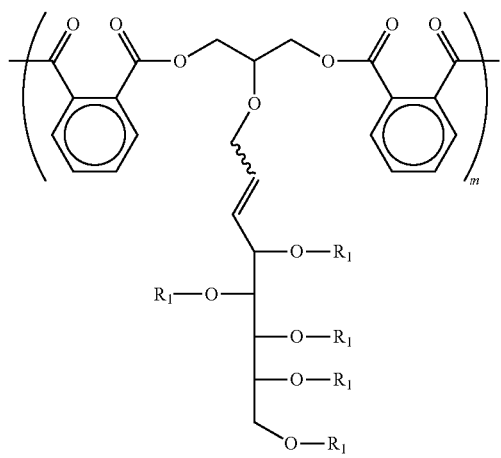

XVI

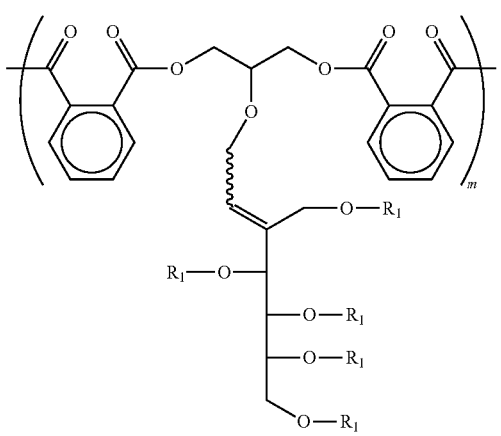

XVII

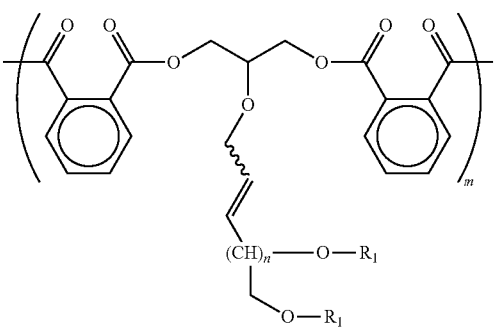

XVIII wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides methods for decomposing ozone comprising contacting ozone with an ozone decomposing composition, wherein said composition comprises a solvent and a polymer comprising a structural repeat unit of Formula XIX, Formula XX, or Formula XXI:

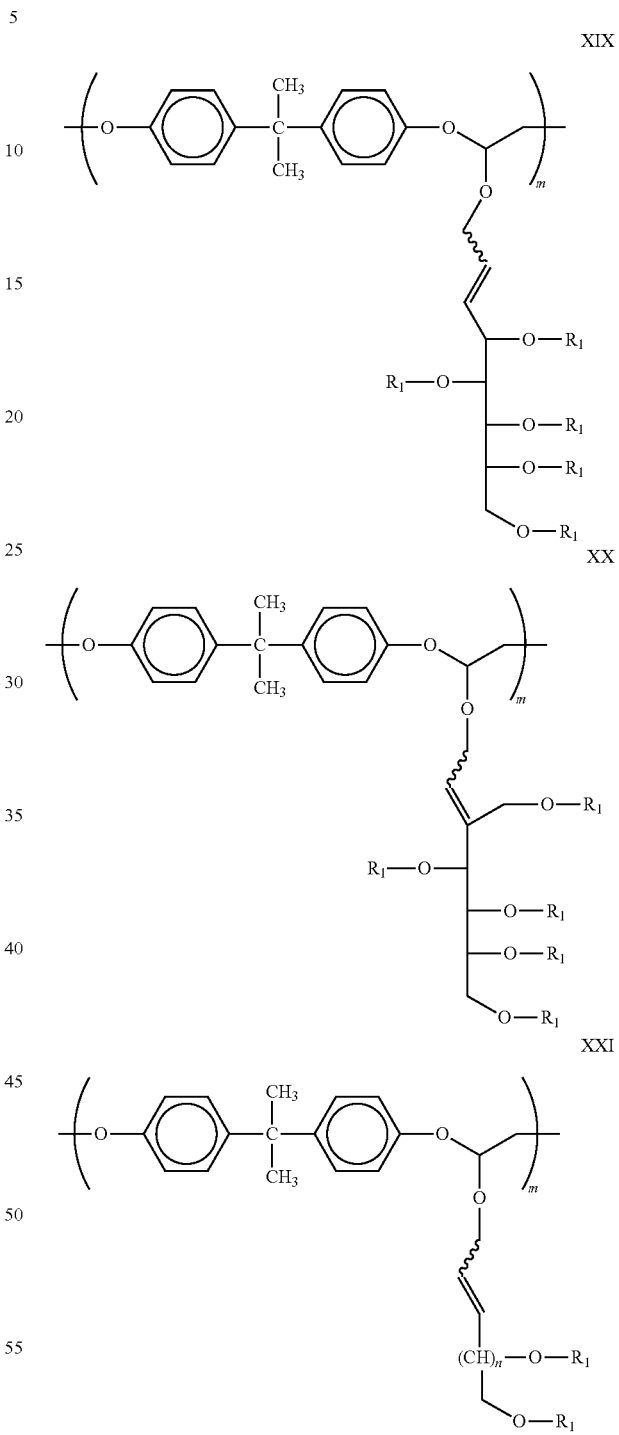

wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another embodiment, the present invention provides methods for decomposing ozone comprising contacting ozone with an ozone decomposing composition, wherein said composition comprises a solvent and a polymer comprising a structural repeat unit of Formula XXII, Formula XXIII, or Formula XXIV:

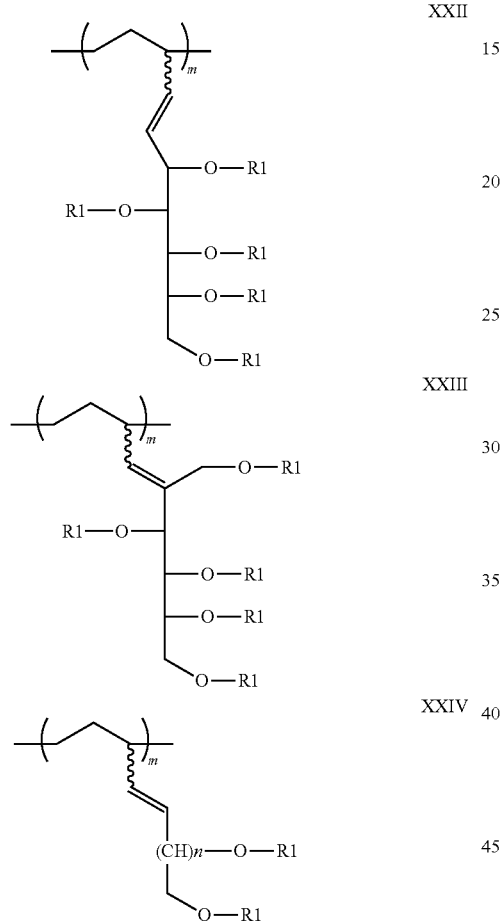

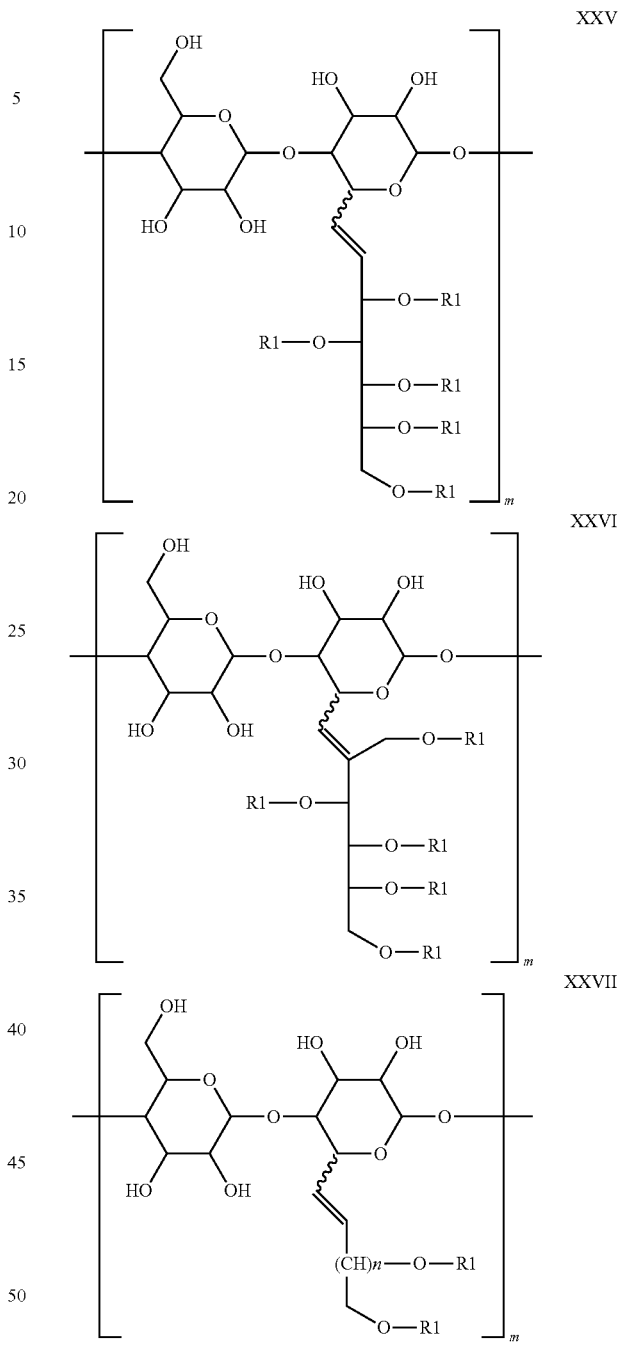

wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides methods for decomposing ozone comprising contacting ozone with an ozone decomposing composition, wherein said composition comprises a solvent and a polymer comprising a structural repeat unit of Formula XXV, Formula XXVI, or Formula XXVII:

wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another embodiment, the present invention provides methods for decomposing ozone comprising contacting ozone with an ozone decomposing composition, wherein said composition comprises a solvent and a polymer comprising a structural repeat unit of Formula XXVIII, Formula XXIX, or Formula XXX:

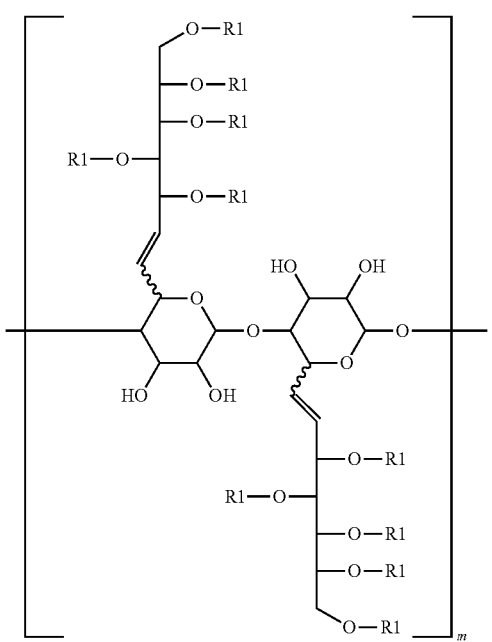

XXVIII

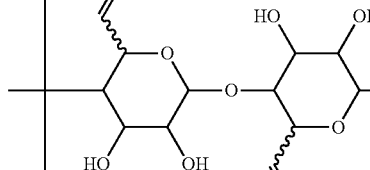

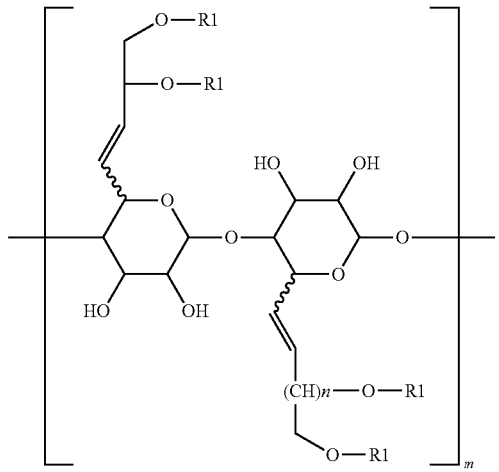

XXX wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides methods for decomposing ozone comprising contacting ozone with an ozone decomposing composition, wherein said composition comprises a solvent and a polymer comprising a structural repeat unit of Formula XXXI, Formula XXXII, or Formula XXXIII:

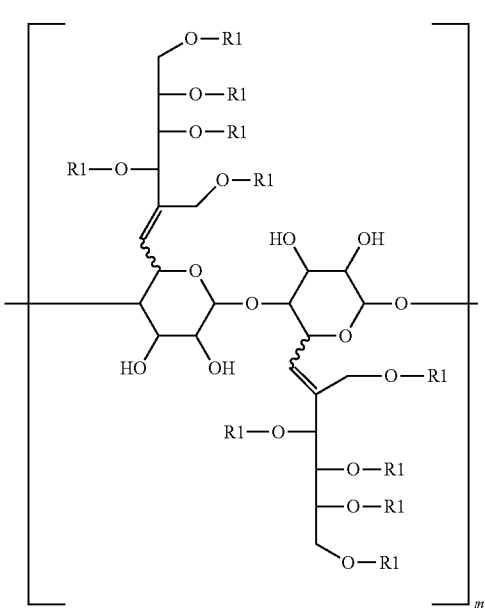

XXIX

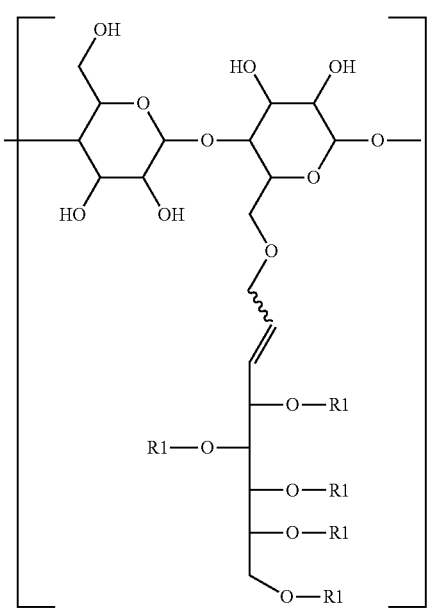

XXXI

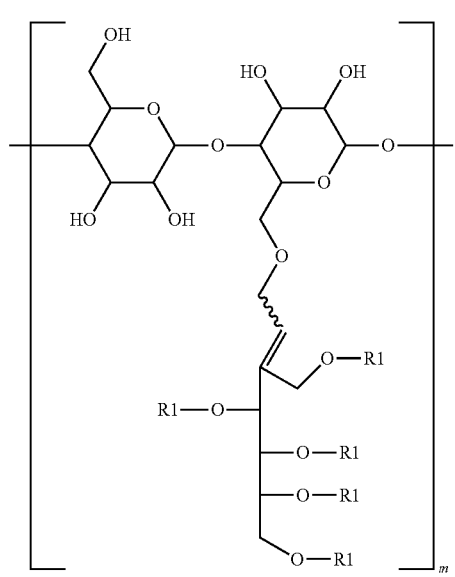

XXXII

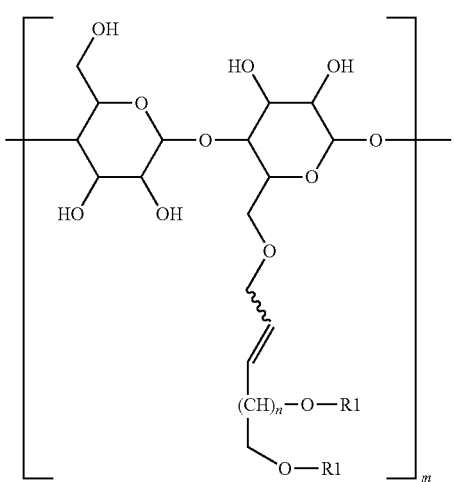

XXXIII

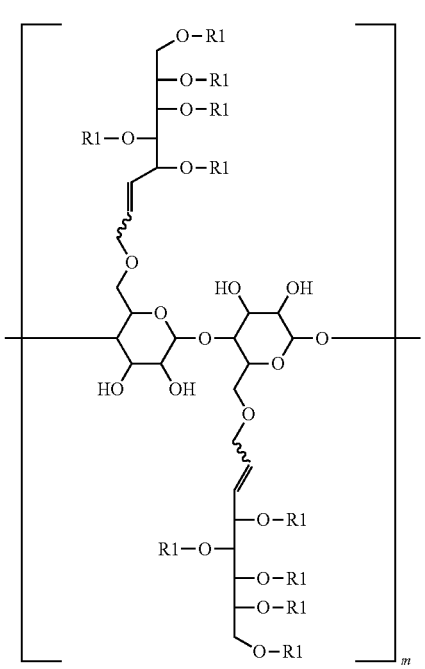

XXXIV

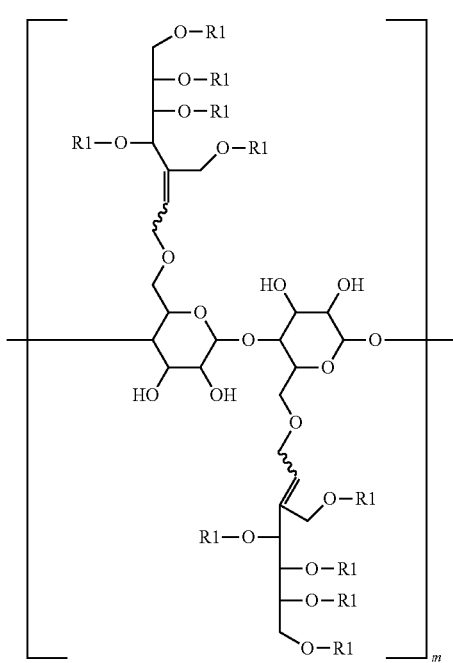

XXXV wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In another aspect, the present invention provides methods for decomposing ozone comprising contacting ozone with an ozone decomposing composition, wherein said composition comprises a solvent and a polymer comprising a structural repeat unit of Formula XXXIV, Formula XXXV, or Formula XXXVI:

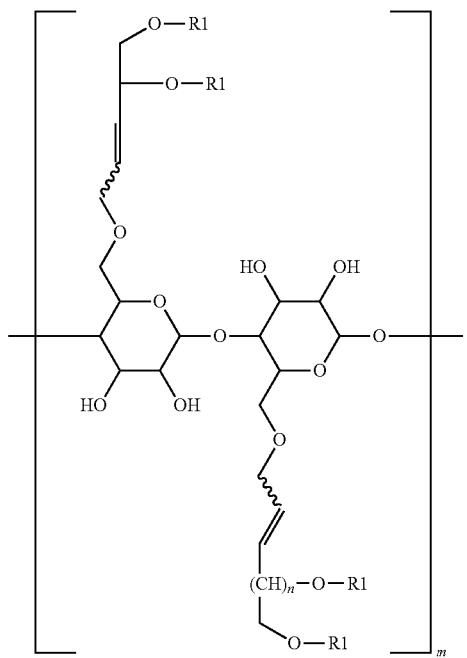

XXXVI wherein m is an integer from 100 to 100,000;

n is an integer from 1-10;

each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein the structural repeat unit comprises at least 50% by weight of the polymer.

In one aspect the present invention provides an ozone reactive polymer comprising a structural repeat unit represented by the following formula XLI:

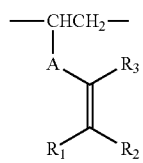

Formula (XLI)

wherein

A is absent or a linking group selected from the group consisting of substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, substituted or unsubstituted arylalkylene, and substituted or unsubstituted heteroarylalkylene;

each of $R_1$, $R_2$ and $R_3$ is, independently, selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and wherein said structural repeat unit comprises at least 10% by weight of said polymer.

With respect to each of the polymers of the present invention, in some embodiments, the repeat unit comprises at least 10% by weight of the polymer. In other embodiments the structural repeat unit comprises at least 20% by weight of the polymer. In other embodiments the structural repeat unit comprises at least 30% by weight of the polymer, and in still other embodiments the structural repeat unit comprises at least 40% by weight of the polymer. In certain embodiments the structural repeat unit comprises at least 50% by weight of the polymer, and in certain other the structural repeat unit comprises at least 60% by weight of the polymer. In yet other embodiments the structural repeat unit comprises at least 70% by weight of the polymer. In still other embodiments the structural repeat unit comprises at least 80% by weight of the polymer, and in still other embodiments the structural repeat unit comprises at least 90% by weight of the polymer.

Ozone reacts with alkenes and alkynes to form organic compounds in a process known as ozonolysis. The multiple bonds in these compounds are oxidized by the action of ozone to provide compounds in which the double bonds have been replaced with oxygen. The outcome of the reaction depends on the type of multiple bonds being oxidized. For example, alkenes can be oxidized by ozone to form alcohols, aldehydes, ketones, or carboxylic acids. Typically, two aldehydes and/or ketones are produced when the olefinic compound is appropriately substituted. Scheme 2 illustrates an ozonolysis reaction between a carbon-carbon double bond and ozone. The reaction provides two aldehydes and/or ketones depending upon the $R_3$-$R_6$ substituents.

The term "aldehyde," as used herein, is given its well-known meaning in the field of organic chemistry, comprising the substituent —CH=O. Similarly, the term "ketone," as used herein, refers to a chemical compound comprising the substituent —C(=O)—.

Scheme 2

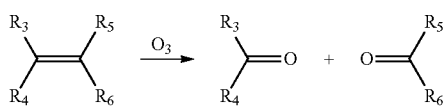

The combustion of fossil fuels produces a group of pollutants, such as methane and other hydrocarbons, which are known to be ozone precursors. Ground level ozone pollution is created by the action of sunlight's ultraviolet rays on these precursors. An increase in ground level ozone levels can lead to respiratory problems (asthma and bronchitis and other lung diseases); and cause cardiopulmonary problems (heart attack). Long term exposure to ozone has been shown to increase the risk of death. In addition, high levels of ozone in the atmosphere destroy the integrity of many elastomeric products found in tires, such as natural rubber, polybutadiene, styrene-butadiene, and nitrile rubber, in a process known as "ozone-cracking."

Nitrogen oxides ($NO_x$) in the atmosphere also react with volatile organic compounds in the air to form ozone in sunlight. The generated ozone can react with other things, such as plants or rubber to produce more volatile organic compounds. These volatile compounds are released into the air and ultimately produce more ozone. The compounds described herein stops this process.

Thus, the polymers described herein, such as those comprising a structural unit represented by the general formula XLI, reacts with ozone at the site of the double bond to provide two aldehydes or two ketones or one aldehyde and one ketone. The nature of the aldehydes and ketones formed by the reaction depends on the side chains $R_1$ and $R_2$ in compounds of formula XLI. Thus, the by-products produced upon reaction with atmospheric ozone is controlled based on the side chains $R_1$ and $R_2$. In one embodiment, one of the aldehydes or ketones is attached to the polyol or sugar derivative, and the other aldehyde or ketone is attached to a monomer or polymer. As used herein, the term "sugar" refers to digestible mono- and disaccharides. Non-limiting examples are glucose, dextrose, sucrose, lactose, maltose and fructose.

Neither of the resulting compounds volatize into the air and therefore, the inhalation of both ozone and dangerous aldehydes such as formaldehyde, is reduced or eliminated. The aldehyde or ketone polyol or sugar derivatives produced does not cause a negative environmental impact. Moreover, surfaces coated with the compounds described herein are saturated with the presence of double bonds, which are present in greater concentration than other paints or clothing. This greater concentration increases the reaction with ozone, and helps reduce ozone levels both indoors and outdoors.

In one embodiment, the structural repeat unit is represented by the formula XLII

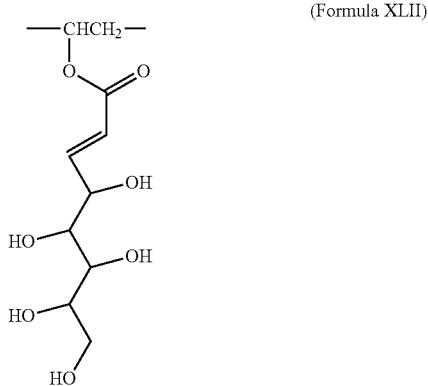

(Formula XLII)

In another embodiment, the structural repeat unit is represented by the formula XLIII

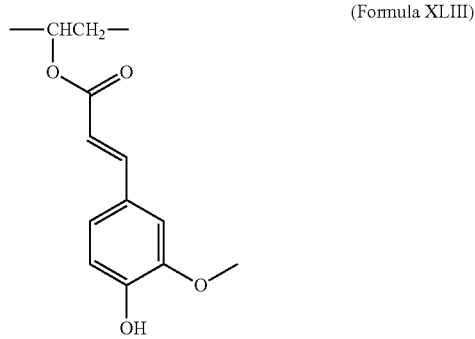

(Formula XLIII)

In some embodiments, the structural repeat unit of formula XLI comprises at least 10% by weight of the polymer. In some embodiments, the structural unit of formula XLI comprises at least 20%, at least 30%, at least 40%, at least 50%, at least 60%, at least 70%, at least 80%, at least 90%, or at least 99% by weight of the polymer. In a preferred embodiment, the structural unit of formula XLI comprise between 60% and 90% by weight of the polymer.

In some embodiments, the polymer decomposes ozone at a rate at least two times faster than in the absence of the polymer. In some embodiments, the polymer has a weight average molecular weight ranging from 9,000 to 30,000 Daltons.

In some embodiments, the primary by-product formed upon reaction of the polymer disclosed herein with ozone is a non-volatile compound. In some of these embodiments, the non-volatile compound is sugar. In other embodiments, the non-volatile compound is vanillin. In some embodiments, the primary by-product is a compound that emits a scent.

In some embodiments, the primary by-products formed upon reaction of the polymer disclosed herein with ozone is a volatile compound. In some of these embodiments, the volatile by-products are safe and non-toxic to humans. Non-limiting examples of such volatile by-products are benzaldehyde, citral, vanillin, raspberry ketone and camphor.

In some embodiments, described herein is a coating comprising the ozone reactive polymer. In some of these embodiments, the said coating is a spray coating.

In some embodiments, the polymers disclosed herein are incorporated onto clothing, fabrics, carpets, paints, sealants, finishes, air-filters, face-masks, cosmetics, creams, lotions, and coatings. In some embodiments, such incorporation results in the clothing, fabric, carpet, paints, sealants, finishes, and coatings having the ability to decompose ozone. Polymers make up the majority of the composition of the paint exposed to the atmosphere, so the reactions with the ozone are much faster the more they are exposed to the atmosphere.

The compounds described throughout this disclosure can be used in several forms. In some embodiments, the polymers described herein are present in a spray or aerosol. When the presence of ozone is known or suspected, the spray can be sprayed in that area. In other embodiments, the polymers described in this disclosure may be used as a coating on surfaces. In this case, when ozone comes in contact with the surface, the double bonded side chain in the polymer reacts with the ozone and reduces the level of ozone. The polymer coating described herein may be visible, invisible, may have texture, or may not have texture. In some embodiments, the polymers of this disclosure are present in a paint.

In one aspect the present invention provides a method for decomposing ozone comprising contacting ozone with an ozone decomposing composition, wherein said composition comprises a solvent and a polymer comprising a structural repeat unit represented by the following formula XLI:

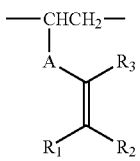

Formula (XLI)

wherein

A is absent or a linking group selected from the group consisting of substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, substituted or unsubstituted arylalkylene, and substituted or unsubstituted heteroarylalkylene;

each of $R_1$, $R_2$ and $R_3$ is, independently, selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl; and and wherein said structural repeat unit comprises at least 10% by weight of said polymer.

In one embodiment of this aspect, the structural repeat unit is represented by the formula XLII:

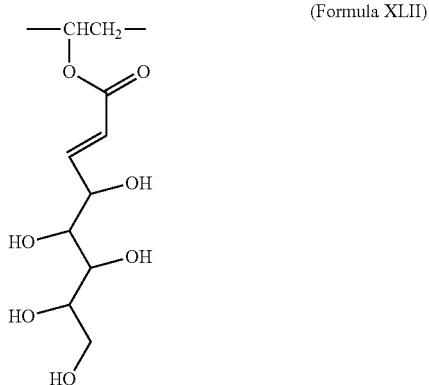

(Formula XLII)

In another embodiment of this aspect, the structural repeat unit is represented by the formula XLIII:

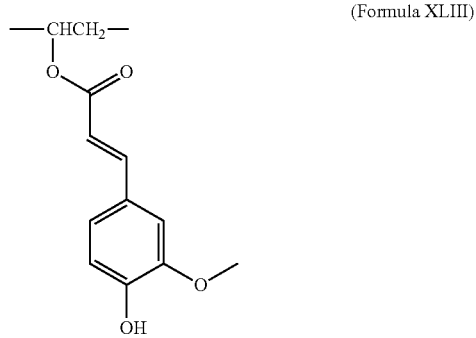

(Formula XLIII)

In some embodiments, the structural repeat unit of formula XLI comprise at least 10% by weight of the polymer. In some embodiments, the structural repeat unit of formula XLI comprise at least 20%, at least 30%, at least 40%, at least 50%, at least 60%, at least 70%, at least 80%, at least 90%, or at least 99% by weight of the polymer. In one embodiment, the structural repeat unit of formula XLI comprise between 60% and 90% by weight of the polymer.

In some embodiments, the polymer decomposes ozone at a rate faster than in the absence of the polymer. In some of these embodiments, the polymer decomposes ozone at a rate at least two times faster than in the absence of the polymer. In some embodiments, the polymer has a weight average molecular weight ranging from 9,000 to 30,000 Daltons. In some embodiments, the primary by-product upon reaction of the polymer with ozone is a non-volatile compound. In some of these embodiments, the non-volatile compound is sugar. In some of these embodiments, the non-volatile compound is vanillin. In some embodiments, the primary by-product upon reaction with ozone is a compound that emits a scent.

Paint is used to decorate, protect and prolong the life of natural and synthetic materials, and acts as a barrier against environmental conditions. Paints contain pigments to impart color and opacity; binders (resin) or polymers that form a matrix to hold the pigment in place; extenders or larger pigment particles added to improve adhesion and strength; solvents (thinners) such as an organic solvent or water to reduce the viscosity of the paint for better application; and additives to modify the properties of the liquid paint or dry film. Most paints contain polymers that act as binders for pigments which give paints their characteristic color. These polymers, however, are relatively unreactive towards ozone. By contrast, the compounds of the present disclosure react with ozone in the atmosphere, which thereby reduces ozone levels. In addition, the ozonolysis reaction produces safe by products, e.g. aldehydes and ketones.

The most important binders (resins) or polymers used in modern paints are: acrylic polymers; alkyd polymers; and epoxy polymers.

Acrylic polymers are used in many emulsion paints. These polymers are based on co-polymerization of vinyl acetate with a propenoate ester. As shown in Scheme 3, vinyl acetate (1) can react with methyl-2-methyl-propenoate (2) to form a random array of linear chained acrylic polymers (3) and (4).

Scheme 3

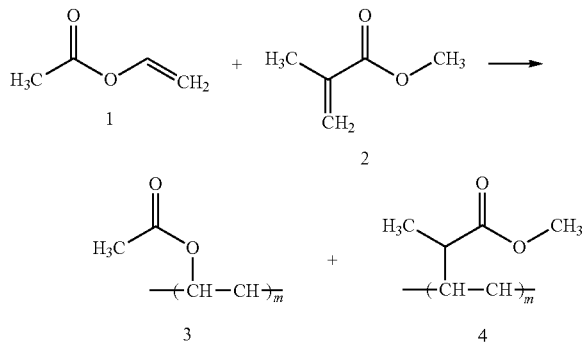

In the above polymerization reaction, the value of m can be controlled to give a range of resins varying from viscous liquids to solids with high melting points. Other acrylic esters commonly used as co-monomers with vinyl acetate include, but are not limited to, methyl propenoate, ethyl propenoate, propyl propenoate, butyl propenoate and stereoisomers thereof.

The compounds of Formula I, II, or III can be incorporated into a derivatized vinyl monomer and undergo similar polymerization reactions. As described above, the double bonds in these polymers can be oxidized by the action of ozone, to provide various aldehyde and/or ketone products.

The derivatized vinyl monomers can be prepared as shown in Scheme 4. Ethyl acetate (5) can react with a compound of Formula IV, V or VI in the presence of base, followed by acidification, to provide the unsaturated ester (6) through an Aldol condensation reaction. Reduction of the unsaturated ester (6) with LiAlH₄ provides the corresponding allyl alcohol, which upon treatment with [Ir(cod)Cl]₂/Na₂CO₃ in the presence of vinyl acetate [Organic Syntheses, Vol. 82, p. 55 (2005)], provides the derivatized vinyl monomer (7).

Scheme 4

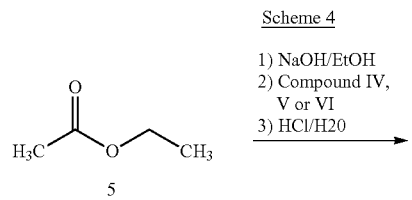

As shown below, the derivatized vinyl monomers produced by the reaction sequence outlined in Scheme 4, include the compounds of Formula VII, Formula VIII, and Formula IX.

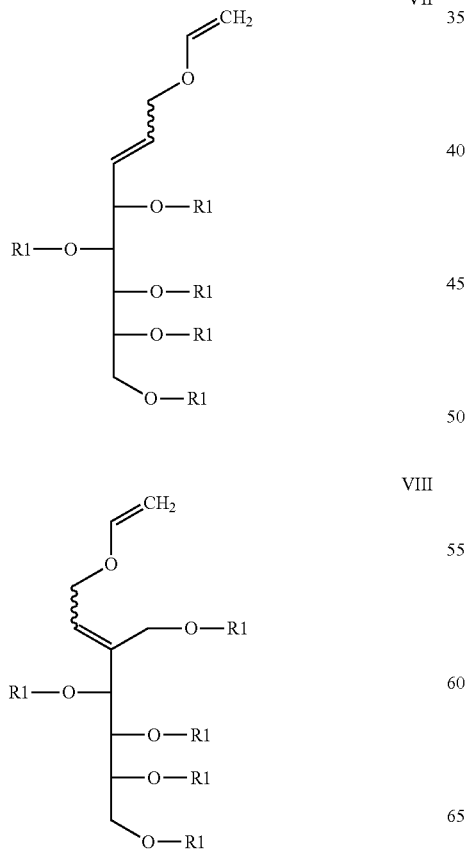

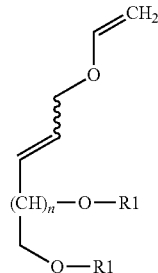

As shown in Scheme 5, the derivatized vinyl monomer compound (7) can polymerize to form a random array of linear chain polymers (8).

Scheme 5

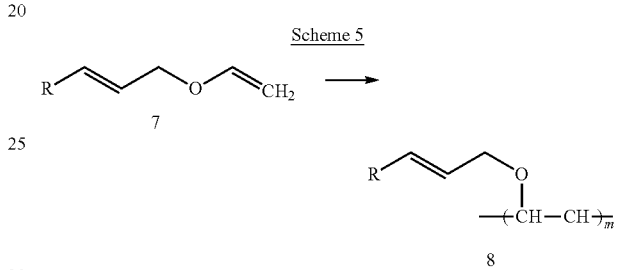

As shown below, the polymers produced by the polymerization reaction outlined in Scheme 5, include the compounds of Formula X, Formula XI, and Formula XII.

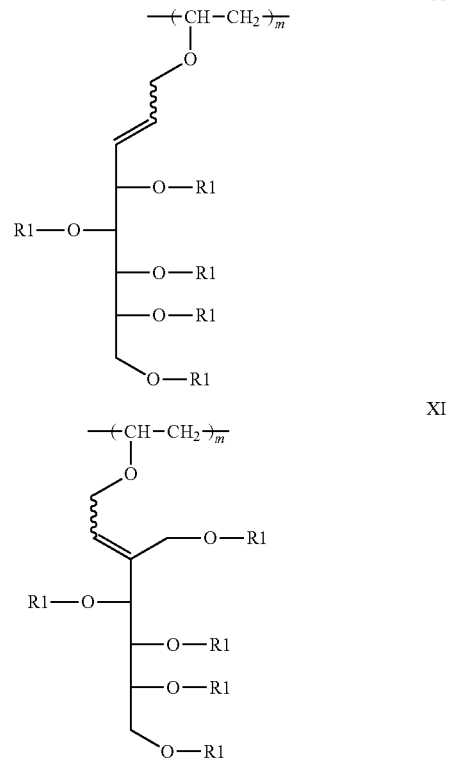

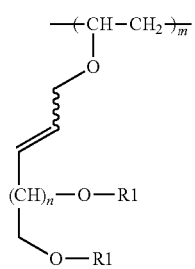

XII

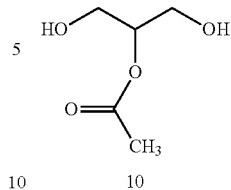

Scheme 7

1) TBSCl/Base
2) NaOH/EtOH
3) Compound IV, V or VI
4) HCl/H2O
→

As shown in Scheme 6, a typical alkyd polymer resin used in gloss paints can be produced by reacting benzene-1,2-dicarboxylic (phthalic) anhydride (9) with a suitably substituted monoglyceride (10) and a drying oil (linseed or soybean oil). When heated together, ester linkages are formed to provide the alkyd polymer (11):

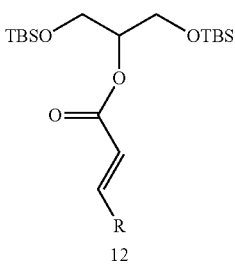

12

Scheme 6

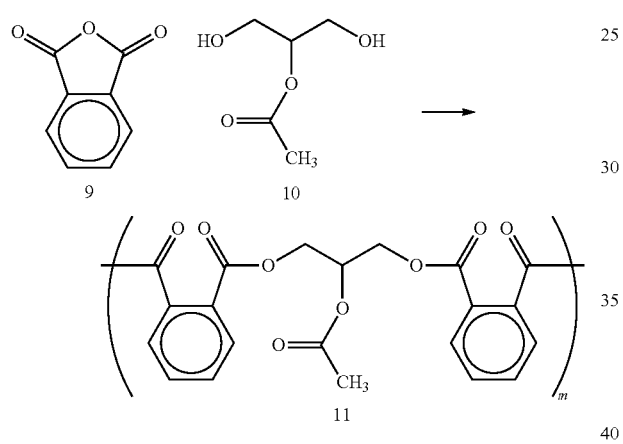

In the above polymerization reaction, the value of m can be controlled to give a range of resins varying from viscous liquids to solids with high melting points.

The compounds of Formula I, II, or III can be incorporated into a monoglyceride monomer and undergo similar polymerization reactions with phthalic anhydride. As described above, the double bonds in these polymers can be oxidized by the action of ozone, to provide various aldehyde and/or ketone products.

As shown in Scheme 7, the derivatized monoglyceride monomers can be prepared through an Aldol condensation reaction. The hydroxyl groups on monoglyceride-2-acetate (10) can be diprotected using tert-butyldimethylsilyl chloride (TBSCl) in the presence of base (N,N-diisopropylethylamine) to generate the corresponding TBS ethers. Reaction of the diprotected compound with a compound of Formula IV, V or VI in the presence of base, followed by acidification provides the unsaturated ester (12) through an Aldol condensation reaction. Reduction of the unsaturated ester (12) with a catalytic amount of $InBr_3$ and excess $Et_3SiH$ [J. Org. Chem., 2007, 5920-5922], and deprotection of the TBS protecting groups with tetra-n-buylammonium fluoride (TBAF) provides the derivatized monoglyceride monomer (13).

As shown below, the derivatized monoglyceride monomers produced by the reaction sequence outlined in Scheme 7, includes the compounds of Formula XIII, Formula XIV, and Formula XV.

XIII

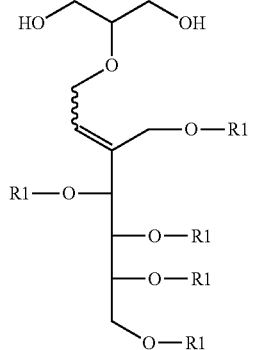

XIV

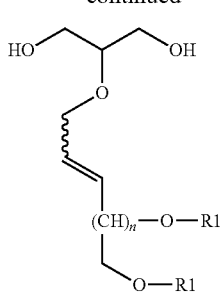

As shown in Scheme 8, benzene-1,2-dicarboxylic (phthalic) anhydride (9) can react with the modified monoglyceride monomers (13) to provide the alkyd polymer (14).

Scheme 8

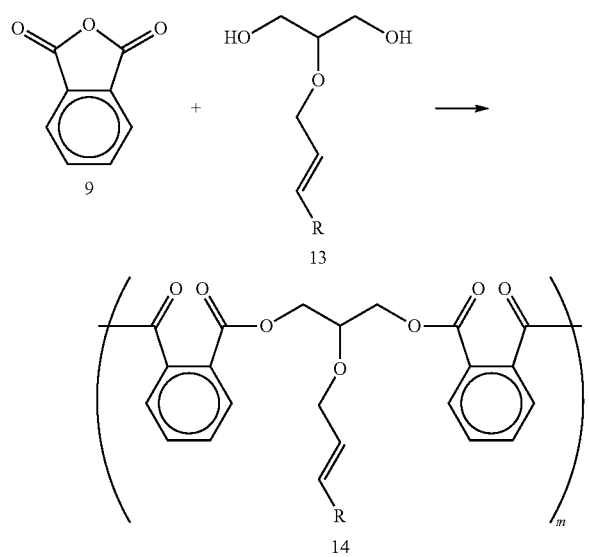

As shown below, the derivatized vinyl ether monomers produced by the polymerization reaction outlined in Scheme 8, includes the compound of Formula XVI, Formula XVII, and Formula XVIII.

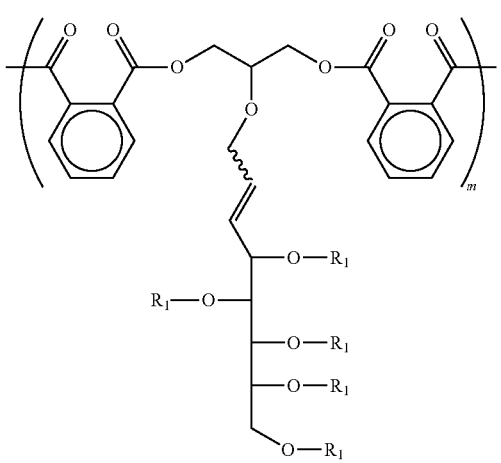

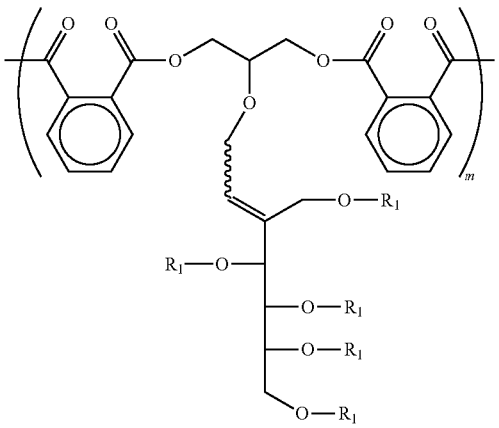

Epoxy resins are often used as the binder in industrial coatings or primers. They give paint excellent adhesion properties together with high resistance to chemicals (corrosion). As shown in Scheme 9, substituted phenols such as bisphenol A (15) and 1-chloro-2,3-epoxypropane (16) can be used to prepare the epoxy resin (17).

Scheme 9

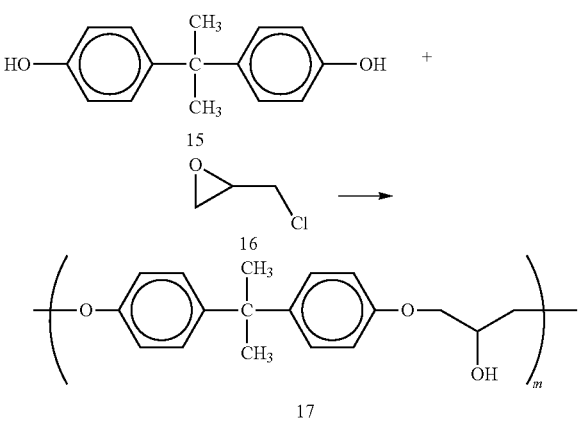

In the above polymerization reaction, the value of m can be controlled to give a range of resins varying from viscous liquids to solids with high melting points. Epoxy resin formulations can be carried in solvents such as aromatic hydrocarbons, alcohols, ketones and esters or as dispersions in water as true emulsions. They are not normally used in topcoats for outdoors because they are susceptible to UV degradation, but they make excellent interior coatings and exterior primers.

The compounds of Formula I, II, or III can be incorporated into an epoxy resin through the free hydroxyl groups present on these polymers. As described above, the double bonds in these polymers can be oxidized by the action of ozone, to provide various aldehyde and/or ketone products.

As shown below in Scheme 10, the epoxy resin (17) can be modified by acylation of the hydroxyl group with acetic anhydride and base, followed by Aldol condensation with a compound of Formula IV, V or VI in the presence of base, followed by acidification, and reduction of the unsaturated ester with a catalytic amount of $InBr_3$ and excess $Et_3SiH$ to provide the derivatized epoxy resin (18).

Scheme 10

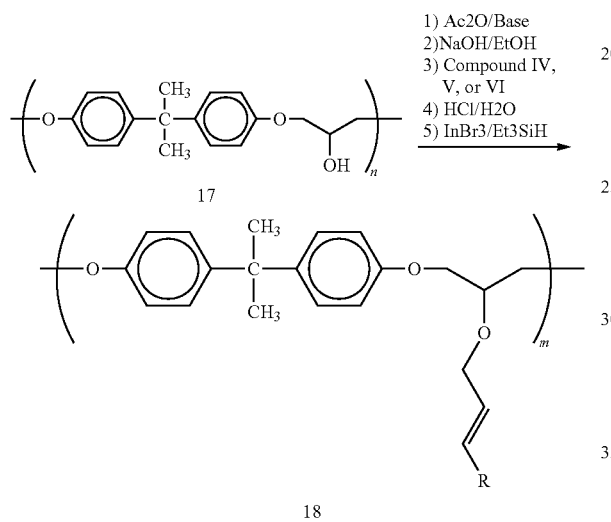

In the above polymerization reaction, the value of m can be controlled to give a range of resins varying from viscous liquids to solids with high melting points. As shown below, the derivatized epoxy resin produced by the polymerization reaction outlined in Scheme 10, include the compounds of Formula XIX, Formula XX, and Formula XXI.

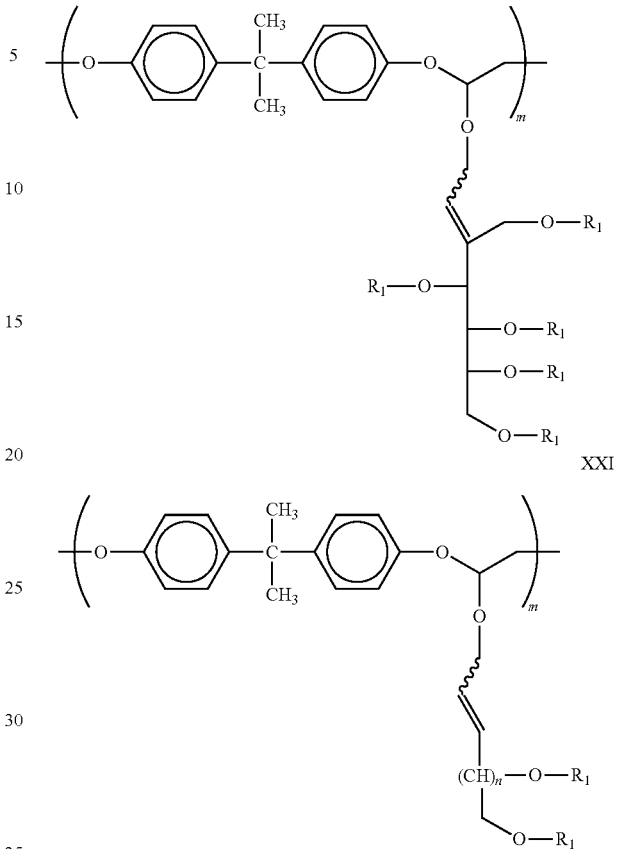

Vinyl polymers are a group of polymers derived from vinyl monomers and are the most commonly used type of plastics. As shown below in Scheme 11, vinyl polymers can be prepared from their corresponding monomers, and include but are not limited to polymers such as polyethylene, polypropylene, polybutadiene, polystyrene, polyvinyl acetate, polyvinyl alcohol, and polyvinyl chloride Scheme 11

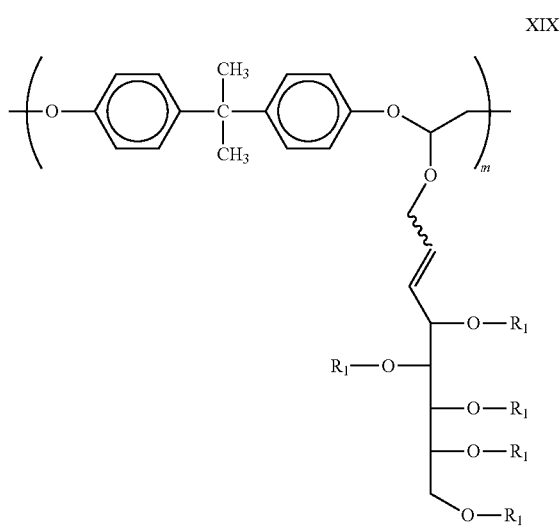

R = Me, CN, OAc, Ph, Cl

In the above polymerization reaction, the value of n can be controlled to give a range of resins varying from viscous liquids to solids with high melting points. The compounds of Formula I, II, or III can be incorporated into these types of vinyl polymers by similar procedures known to those of skill in the art. As described above, the double bonds in these polymers can be oxidized by the action of ozone, to provide various aldehyde and/or ketone products.

For example, the compounds of Formula I, II, or III can be incorporated into a polyalkyl halide. As shown below in Scheme 12, reaction of a polyalkyl halide (19) with $Ph_3P$ forms an ylide, which reacts with a compound of Formula IV, V or VI through a Wittig coupling procedure to provide the olefinic polymer (20).

Scheme 12

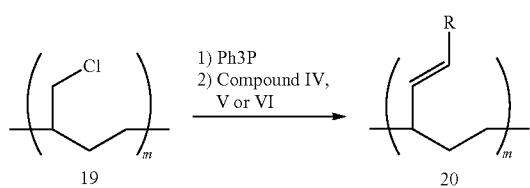

In the above polymerization reaction, the value of m can be controlled to give a range of resins varying from viscous liquids to solids with high melting points. As shown below, the olefinic polymer produced by the polymerization reaction outlined in Scheme 12, include the compounds of Formula XXII, Formula XXIII, and Formula XXIV.

XXII

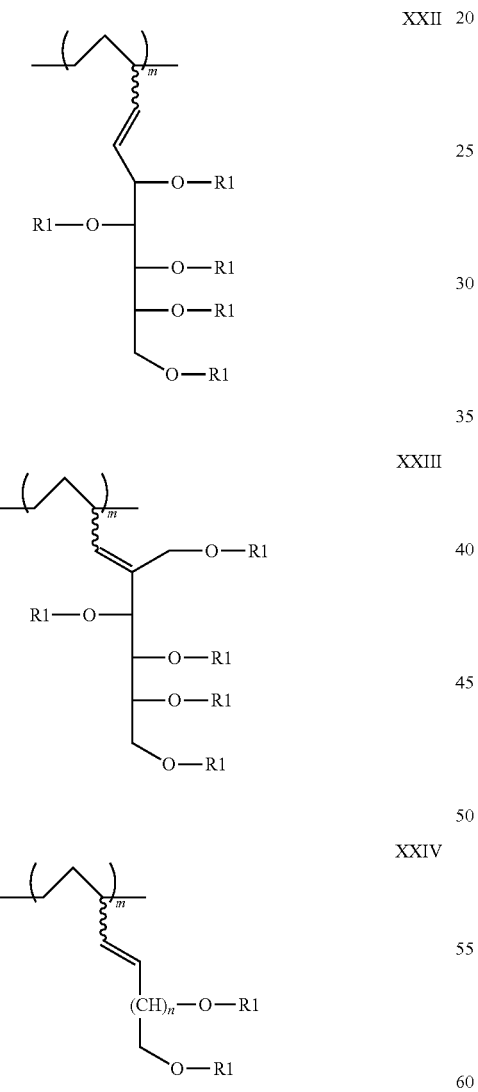

XXIII

XXIV

Cellulose is a polysaccharide consisting of a linear chain of several hundred to over ten thousand β(1-4) linked D-glucose units. Cellulose is the most abundant organic polymer and is found as a structural component in many plants. It also found in many fabrics, for example, the cellulose content of cotton fiber is about 90%.

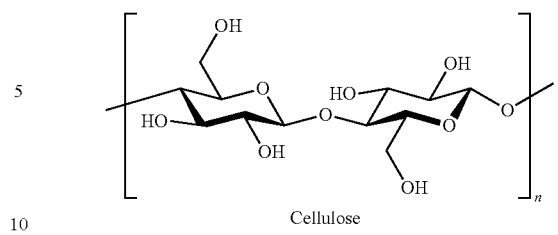

Cellulose

As shown below in Scheme 13, cellulose may be modified to incorporate the compounds of Formula I, II, or III through a Witting reaction sequence. For example, reaction of cellulose (21) in the presence of dilute acid (HCl) and Ph$_3$P forms an ylide, which reacts with a compound of Formula IV, V or VI through a Wittig coupling procedure to provide the olefinic polymer (22).

Scheme 13

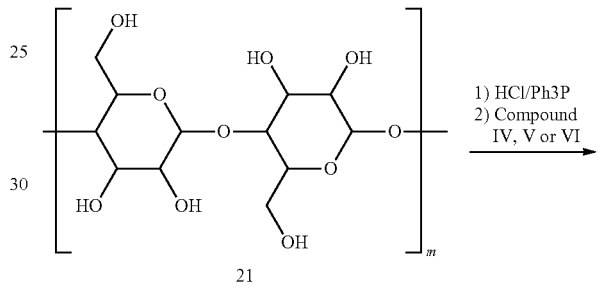

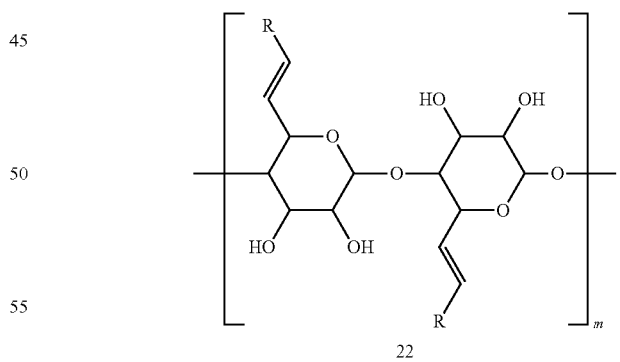

In the above polymerization reaction, the value of m can be controlled to give a range of resins varying from viscous liquids to solids with high melting points. As shown below, the olefinic polymer produced by the polymerization reaction outlined in Scheme 13, include the polymers comprising a structural repeat unit of Formula XXV, Formula XXVI, Formula XXVII, Formula XXVIII, Formula XXIX, or Formula XXX.

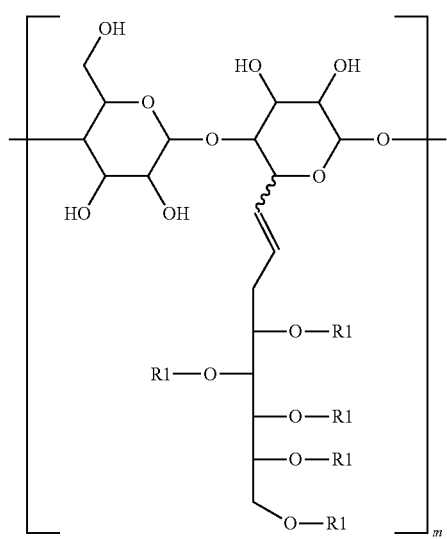
XXV
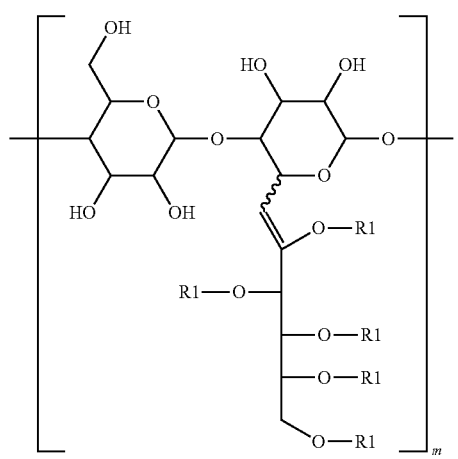
XXVI
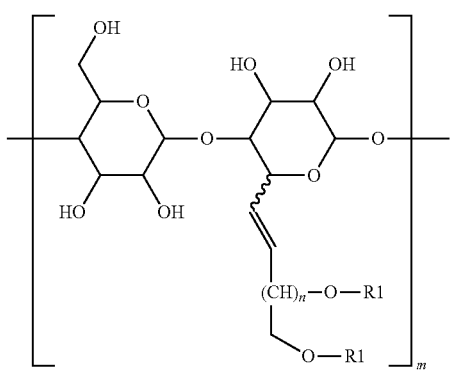
XXVII
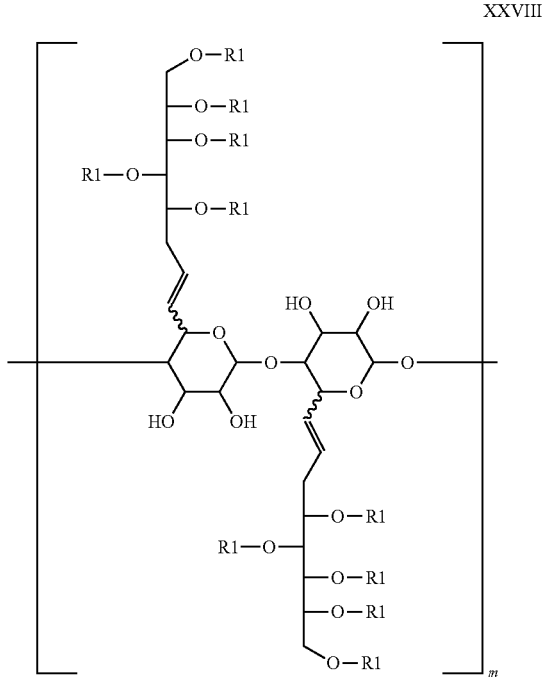
XXVIII
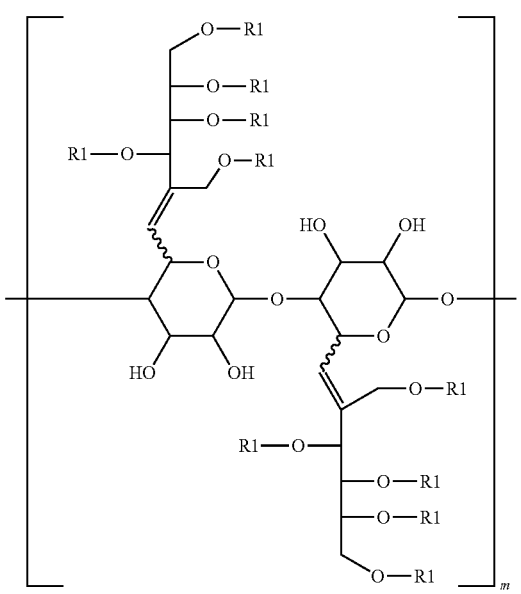
XXIX

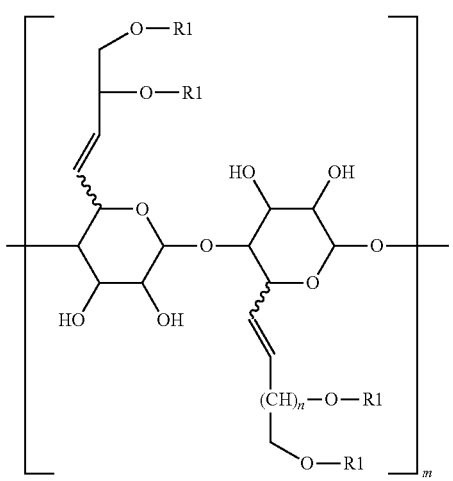

XXX

Alternatively, the compounds of Formula I, II, or III can be incorporated into cellulose (21) through the sequence shown in Scheme 14. Acylation of the primary alcohols in cellulose (21), followed by Aldol condensation of the corresponding acetates with a compound of Formula IV, V or VI, and reduction of the carbonyl group as previously described, provides the derivatized cellulose polymer (23).

Scheme 14

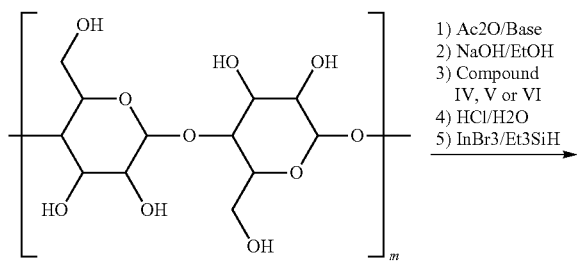

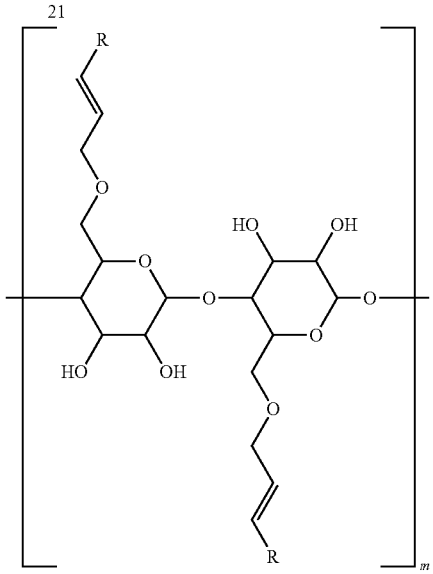

In the above polymerization reaction, the value of m can be controlled to give a range of resins varying from viscous liquids to solids with high melting points. As shown below, the derivatized cellulose polymer produced by the polymerization reaction outlined in Scheme 14, includes polymers comprising a structural repeat unit of Formula XXXI, Formula XXXII, Formula XXXIII, Formula XXXIV, Formula XXXV, or Formula XXXVII, where each $R_1$, m and n is as defined above.

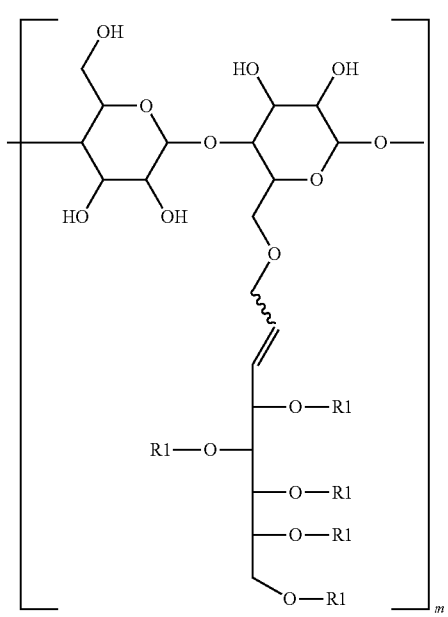

XXXI

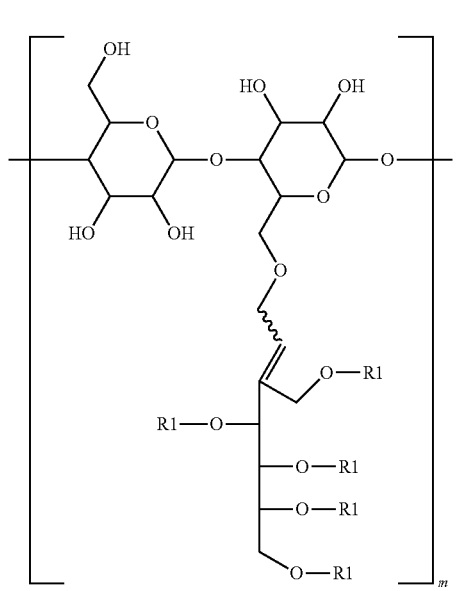

XXXII

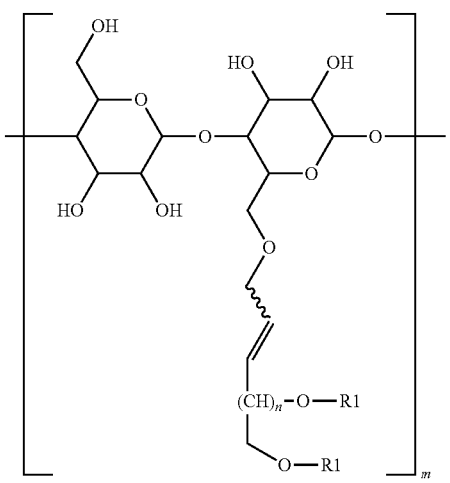

XXXIII

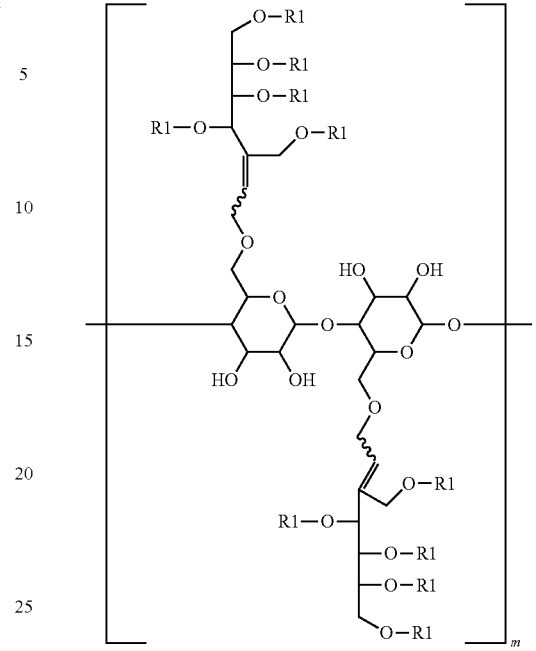

XXXV

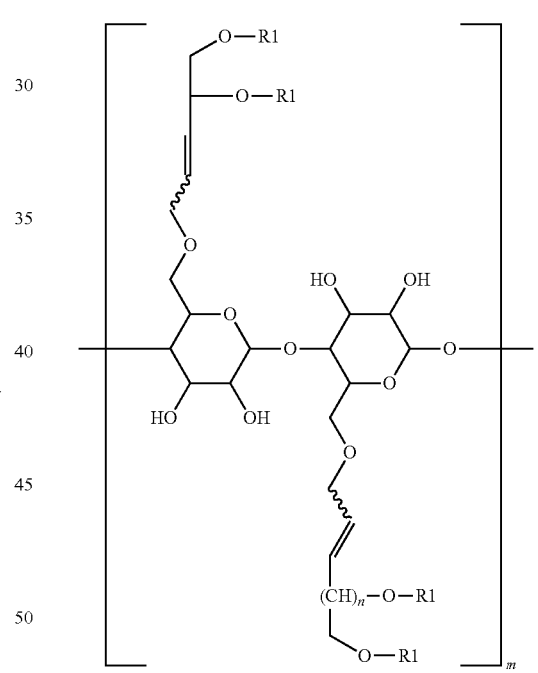

XXXVI

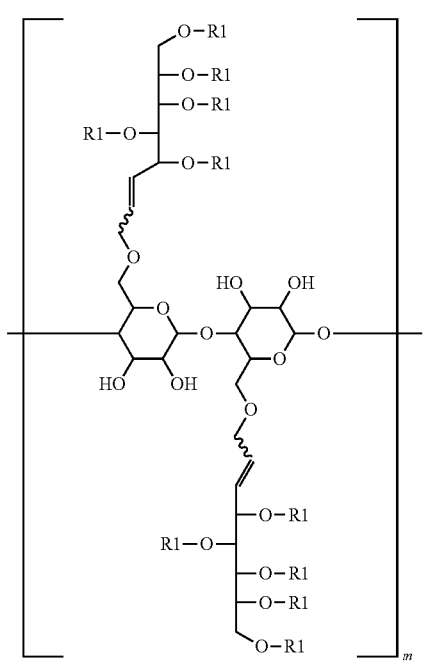

XXXIV

In some embodiments, the polymers and compounds described herein are used in conjunction with other means to remove ozone and/or other types of pollution. These means include, but are not limited to, metals that bind to carbon monoxide, metal nanoparticles or traces of metal for further oxidation or reduction of sulfur oxides and nitrogen oxides in the presence of sunlight, hydroxides that react with sulfur oxides, nitrogen oxides, ammonia, carbon dioxide, hydrogen sulfide, and other air pollutants, and other highly reactive functional groups.

In some embodiments, the side chains of the polymers and compounds described herein are altered in order to adjust its polarity. Alterations include, but is not limited to, addition or deletion of a hydrocarbon group, phenyl groups, alcohols, carboxylic acids, or any other functional group or side chain group. Different polarities have different advantages. For example, one polarity may allow for better mixing, while another polarity may allow rain to be less or more absorbed.

In some embodiments, the polymers described herein undergo color changes upon reaction with ozone. In other embodiments, upon reaction with ozone, fragrant compounds, such as cinnamaldehyde or vanillin are produced. This fragrance indicate that the reaction is working. In some embodiments, the polymers described herein has a varying degree of smoothness or texture. In some embodiments, the side chains in the polymers are altered such that it reacts with water or other solvents to a varying degree.

In some embodiment, the polymers and compounds described herein are added to a paint. In these embodiments, the paint helps minimize environmental effects caused by ozone. In some of these embodiments, the polymers and additives also increase the paint strength and adhesion.

The compounds described herein can also be attached to any of the following including but not limited to: pigments, additives, cross-linker or polymer resin group, co-vehicles, solvent, and any other category added to paints, adhesives, or coating agents.

The presence of double bonds in the polymers and compounds described herein allow for reaction with ozone in the atmosphere to form aldehydes or ketones compounds. This reaction is shown in Scheme 15. The addition of double bonds or incorporation of double bonds, or use of double bonded polymers, cross-linkers, co-vehicles, additives, pigments, or other groups added to the paint that might associate with the cross-linkers or polymers, will be exposed to the atmosphere. These groups may be hydrophobic or hydrophilic, or both. In addition, the use of double bonded molecules that might act as one, two, or several different categories, and might chemically bind additives, pigments, polymer resins, co-vehicles, solvents, and other categories added to paint.

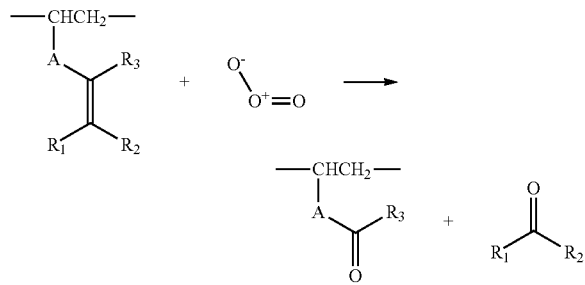

Scheme 15

In the polymers and compounds described herein, the addition of a double bonded or unsaturated molecule may be comprised in or attached to cross-linkers, polymers, co-vehicles, solvents, additives, and pigments, and incorporated into paint, such that upon reaction with ozone, it does not produce harmful volatile organic compounds. This may also include unsaturated vitamins, flavonoids, carotenoids, and other natural unsaturated molecules found in the environment and plants that will react with ozone to produce non-volatile organic compounds. An example of this is Vitamin C which reacts with ozone to produce dehydroascorbic acid. Other products that can be performed maybe salts, a molecule with a high boiling point or melting point, contain charges that keep it from volatilizing, be safe or non-harmful to human health, may form a gas such as nitrogen gas or other gases, produce no or less negative environmental impacts upon washing away due to rain, maybe beneficial to the environment such as helping the soil or organisms in the soil, may create molecules that be used as anti-fouling agents, creates molecules that do not produce volatile organic compounds that will eventually produce more ozone, creates volatile organic compounds upon reaction with ozone that are non-toxic, are used for fragrant smells such as aromatic compounds, beneficial or neutral to the environment, allows the paint to breathe whether expand or contract that maybe beneficial to the paint coating, or forms a secondary reactive agent such as hydroxyl radicals that may react with other air pollutants.

The polymers and compounds described herein can be attached to or comprised in the cross-linkers or polymeric resin of a paint. Because the cross-linkers or polymers are what holds up the paint to the wall and are the molecules exposed to the atmosphere, this is the group that will react with the ozone. The use of double bonded polymers that do not release any by-products upon reaction with ozone, such as when the double bond is attached on both sides to a polymer or some other molecules that upon reaction with ozone will form ketones and aldehydes that will stay attached and be incorporated into the paint, and the paint or bonding agent does not degrade over time.

In some embodiments, the polymers described herein are incorporated into spheres or other structures that might provide a higher surface area such as fullerenes, or other compounds. A further example is if each side chain contains multiple unsaturated bonds that allows for even greater reactivity towards ozone.

In the compounds and polymers described herein, the use of double bonded molecules attached to polymers, cross-linkers, emulsifiers, additives, pigments, and any other group added to paint that upon reaction with ozone does not destroy the molecule itself, but only a side chain. For example, if oleic acid is used in the paint as the polymer, but ozone reacts with it, it will be turned into two by-products. If a saturated polymer is used but double bonded molecules are added to the polymer, then upon reaction with ozone, side chains will fall off, but the polymer chain will still function properly and not affect the paint or adhesive bonding agent.

In the compounds disclosed herein, the incorporation of different mixtures of polymers or cross-linkers that constitute different percentages based on the different qualities of the paint that want to be produced. For example, the cross-linker or polymeric resin can constitute that has ozone reducing compounds attached may constitute 1-100 percent composition, while other polymeric cross-linkers maybe added to change its polarity, allow it to breathe better, change its structure, allow it to dissolve or be incorporated into paint mixtures better, or other reasons not specified.

In some embodiments, the compounds and polymers described herein are present in paint. In these embodiments, the amount of polymer or crosslinker in the paint can vary from 0% to 99%. Other ingredients present in paint are emulsifier (0% to 99%), solvent (0% to 99%), additives (0% to 99%), and pigments (0% to 99%).

In some embodiments, the compounds, polymers, and methods described can be incorporated into clothing, glues, and adhesives, or incorporated as a coating on carpets, fabrics, wallpaper, and paint.

The following examples are provided to further illustrate the embodiments of the present disclosure, but are not intended to limit the scope of the disclosure. While they are typical of those that might be used, other procedures, methodologies or techniques known to those skilled in the art may alternatively be used.

EXAMPLE 1

Synthesis of Glucose Derivative and Vanillin Derivative of Poly (Vinyl Alcohol) (PVOH)

Glucose derivative and vanillin derivative of polymer vinyl alcohol were synthesized according to the following 2-step reaction as shown in Scheme 16.

Step 1. Synthesis of Polymer A via Esterification of PVOH with Bromoacetyl Bromide. PVOH (5.2418 g, 80 mmol OH groups) was dissolved in DMAc/5 wt % LiCl solvent system (150 mL) at 80° C. The solution was cooled down to room temperature and charged into a three-necked flask equipped with a nitrogen inlet and outlet, dropping funnel, magnetic stirrer and thermometer. Pyridine (9.71 mL, 120 mmol) was added to the flask as an acid acceptor. DMAc solution (80 mL) containing bromoacetyl bromide (10.45 mL, 120 mmol) was then added dropwise at about 0° C. with stirring. The reaction mixture was then reacted at room temperature for 18 h. After reaction, the solution was poured into large amount of 2M HCl (1.2 L) to precipitate the product. The precipitated product was filtered and washed three times with cold distilled water, and dried under vacuum oven at 50° C. to constant weight. In this example shown in scheme 16, the number of "y" structural units in the polymer is about four times the number of "x" structural units.

Step 2 for Synthesis of Polymer B via Wittig Reaction of Bromoacetylated PVOH (Polymer A) with Glucose. Polymer A (3 g, 16.09 mmol Br groups) and TPP (5.06 g, 19.29 mmol) was dissolved in THF (120 g), then water (60 g) was added into above solution. The solution was kept at 60° C. for 1 hour. TEA (2.4 g, 23.71 mmol) and glucose (5.4 g, 29.97 mmol) were charged. The reaction mixture was then reacted at 60° C. for 87 hours. The bottom layer was collected, washed with heptane, THF, isopropanol, dichloromethane, and vacuum dried at 50° C. to constant weight.

Step 2 for Synthesis of Polymer C via Wittig Reaction of Bromoacetylated PVOH (Polymer A) with Vanillin. Polymer A (100 mg, 0.536 mmol Br groups), TPP (253.21 mg, 0.965 mmol), and vanillin (122 mg, 0.804 mmol) were charged into saturated sodium bicarbonate solution (10 mL). The solution was kept at 25 oC for 65 hours. The color of the reaction mixture changed after the reaction. A solid powder was obtained after drying Scheme 16: Synthesis of Polymer A (bromoacetylated PVOH), Polymer B (glucose derivative of poly vinyl alcohol), and Polymer C (vanillin derivative of PVOH) from polyvinyl alcohol.

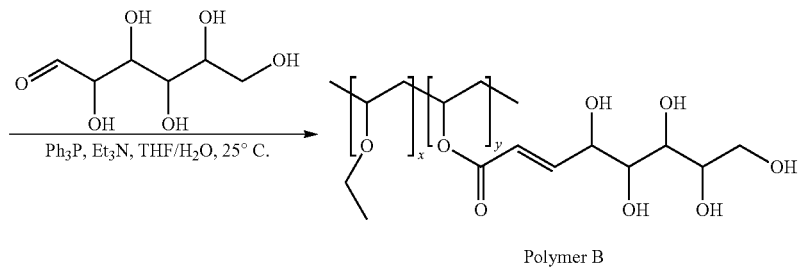

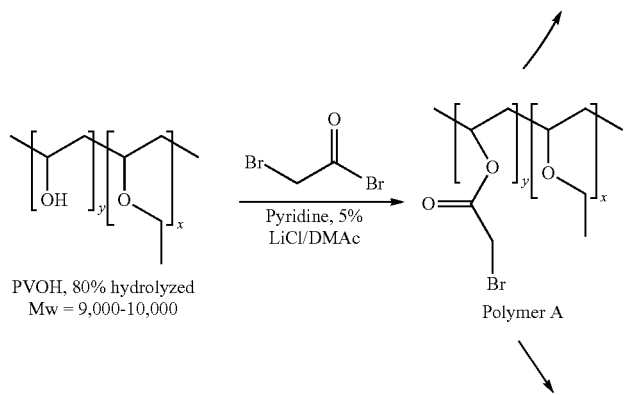

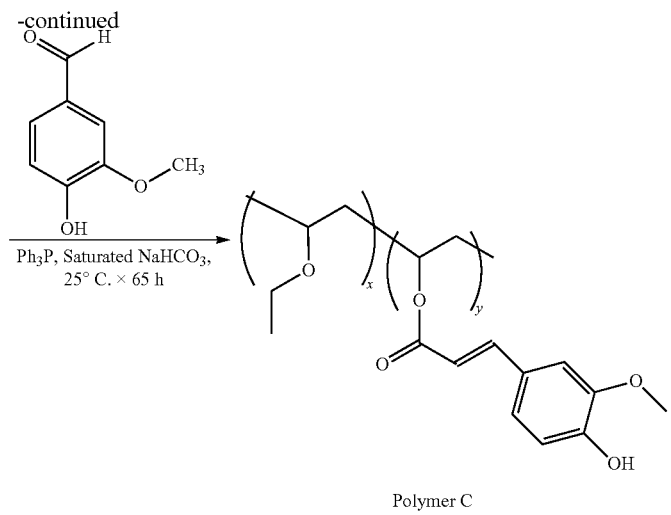

Polymer C

Scheme 16: Synthesis of Polymer A (bromoacetylated PVOH), Polymer B (glucose derivative of poly vinyl alcohol), and Polymer C (vanillin derivative of PVOH) from polyvinyl alcohol.

EXAMPLE 2

Characterization of Glucose Derivative of Poly(Vinyl Alcohol)

FTIR and NMR characterization of bromoacetylated PVOH (polymer A) showed that all the hydroxyl group of the polyvinyl alcohol disappeared after esterification by bromoacetyl bromide. New resonance peak at around 5.05 ppm in NMR indicated the success of the esterification of polyvinyl alcohol with bromoacetyl bromide.

FTIR and NMR characterization of glucose derivative of polyvinyl alcohol (polymer B) showed the hydroxyl group formation, which comes from glucose, and also the double bond formation which comes from the Wittig reaction. NMR resonance peaks at around 6.2 ppm and 6.6 ppm also indicated double bond formation and the success of the Wittig reaction of glucose with bromoacetylated PVOH.

EXAMPLE 3

Ozonolysis of Polymer B (Glucose Derivative of PVOH)

An ozone generator, ozone meter, and fan were put inside a 20 liter storage container (polyvinylethylene and polyvinyl propylene). Any cracks or openings in the container were sealed off with tape. For the blank run, the fan was turned on and the ozone level was measured with the ozone meter every 30 seconds. For the negative control, the ozone generator was turned on until ozone level reached 10 ppm, and then unplugged it. The degradation of ozone due to random reactions (such as rubber extension cords in the box) was monitored.

For the positive controls, polymer B was dispersed in water and applied on the surfaces of the inside of the container. While it took about 1 minute to reach 10 ppm ozone concentration in the negative concentration, in the presence of polymer B it took 4 minutes to reach around 4.5 ppm ozone concentration. This indicated that the generated ozone reacted with the polymer during the charging, which caused the longer time to reach certain level of ozone. The decay of ozone concentration was monitored and recorded every 30 seconds. Ozonolysis results showed that in the presence of polymer B, it took about 4 minutes to decrease the ozone concentration to zero, whereas it took about 10 minutes to decrease the ozone concentration to zero in the absence of polymer B.

EXAMPLE 4

Ozonolysis of Polymer B (Glucose Derivative of PVOH) Generates Aldehydes or Ketones 0.1 g of the polymer B was mixed in 40 mL of water, stirring vigorously. An ozone generator was used to pump ozone into the beaker for 30 minutes. This resembled atmospheric conditions where atmospheric water, double bonds and ozone react together to form aldehydes and/or ketones. NMR spectra showed that as the reaction was progressing a peak formed ~10 ppm, indicating that an aldehyde formed upon reaction of the polymer with ozone. At the same time, the NMR peak at 6-7 ppm, which is from the double bonds present in the polymer, disappeared slowly. Once the reaction completed, the aldehyde peaks disappeared indicating that glucose has been produced.

EXAMPLE 5

A Spray Comprising Polymer B 5 g of polymer B, 32 ounces of water and a few drops of detergent/emulsifier were mixed together to form a solution. This solution was put in a spray bottle. This spray is useful for decomposing and removing ozone.

EXAMPLE 6

By-Products of the Reaction of Polymer and Ozone Acts as an Air Scrubber

When the double bond of the polymer described herein reacts with ozone, it forms an ozonide. This ozonide decomposes instantaneously as a result of atmospheric water vapor to form aldehydes and/or ketones, depending on the structure of the molecule. The other byproducts formed are hydroxyl radicals. These hydroxyl radicals are only present for a split second because they are so reactive and react with virtually anything. For this reason hydroxyl radicals are known as an air scrubber, which removes air pollution from the air. For example, it reacts with methane, formaldehyde, and carbon monoxide to form carbon dioxide. It also reacts and oxidizes halogenated chemicals that can hurt the ozone layer, and initiate the removal of these relatively non-reactive chemicals from the air. Other reactions may include further oxidizing nitrogen oxides, volatile organic compounds, and sulfur oxides. For these reasons, they are an important part of Earth's atmospheric chemistry. In this way, the polymers described herein may be used to remove atmospheric contaminants besides ozone.

While the present disclosure has been described and illustrated herein, it is intended that the specification and examples be considered as exemplary only, with the true scope and spirit of the invention being indicated by the following claims.

What is claimed is:

1. An ozone decomposing composition comprising a solvent and a polymer, wherein the polymer comprises a structural repeat unit selected from the group consisting of Formula X, Formula XI, Formula XII, Formula XVI, Formula XVII, Formula XVIII, Formula XIX, Formula XX, Formula XXI, Formula XXII, Formula XXIII, Formula XXIV, Formula XXV, Formula XXVI, Formula XXVII, XXVIII, Formula XXIX, Formula XXX, Formula XXXI, Formula XXXII, or Formula XXXIII, Formula XXXIV, Formula XXXV, and Formula XXXVI:

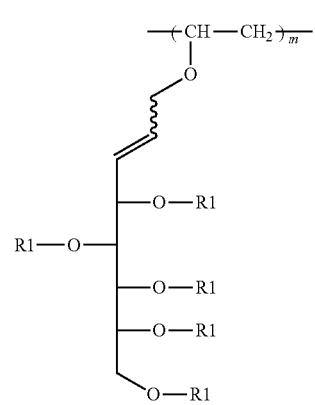

X

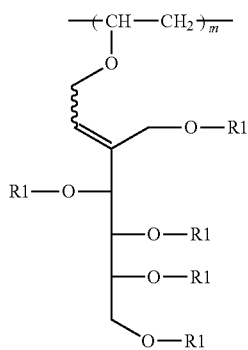

XI

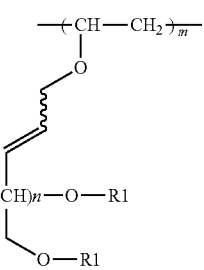

XII

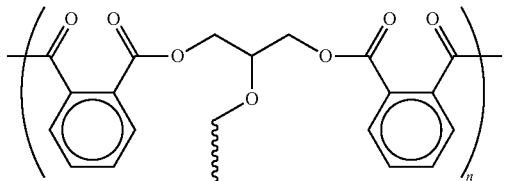

XVI

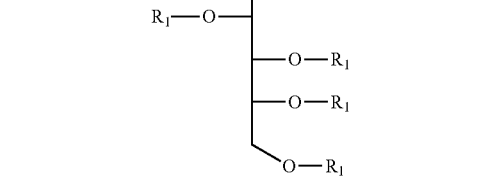

XVII

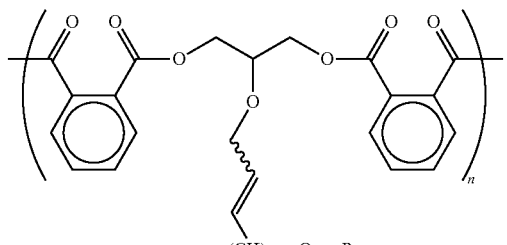

XVIII

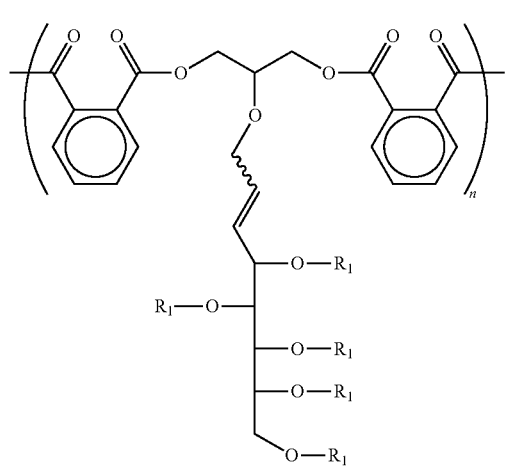

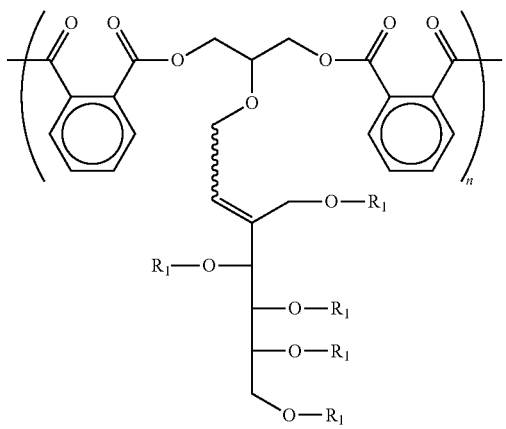

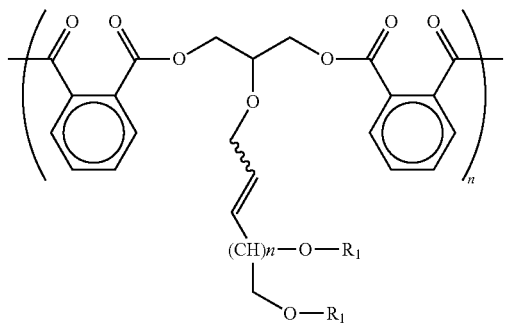

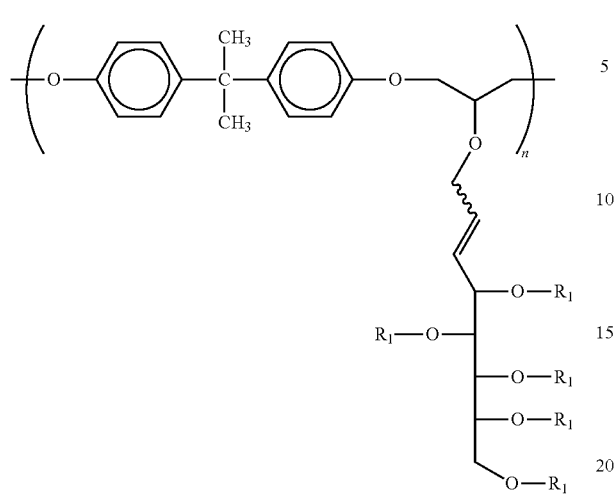
XIX
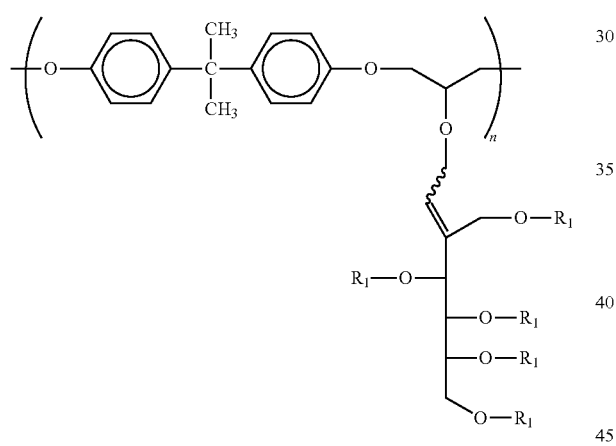
XX
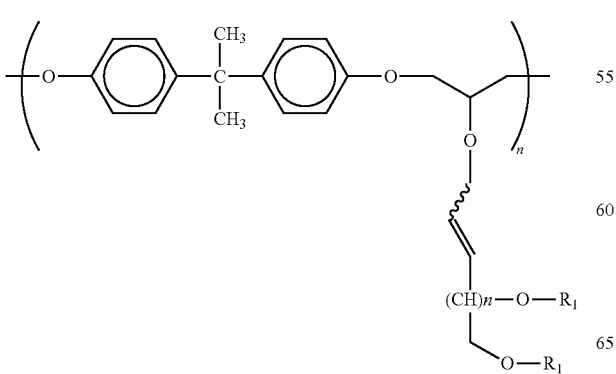
XXI
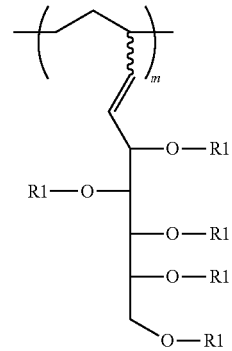
XXII
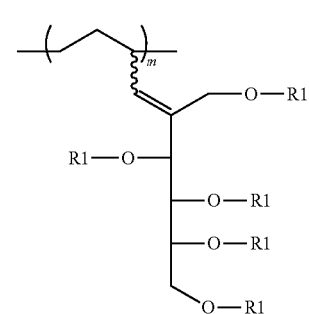
XXIII
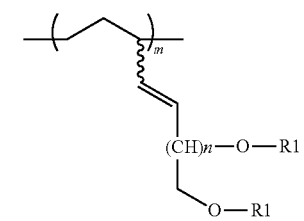
XXIV
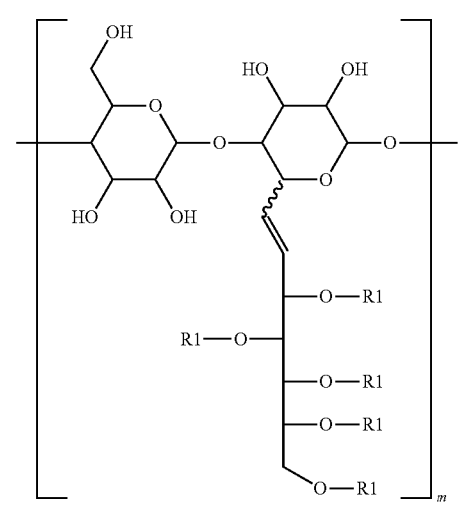
XXV

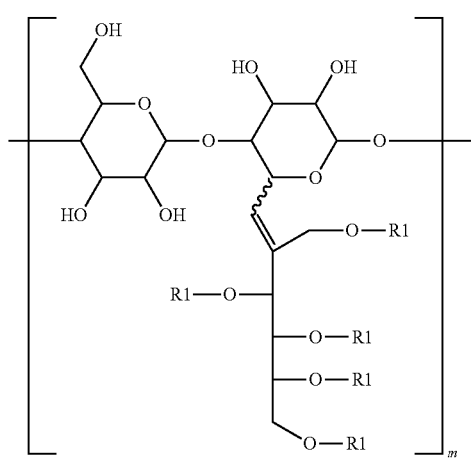
XXVI
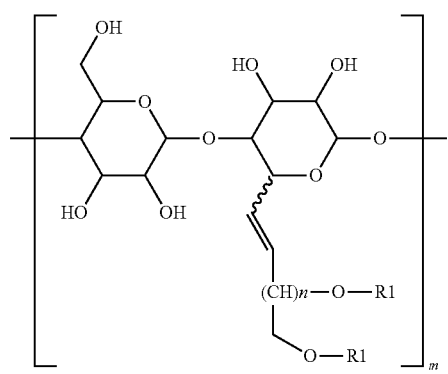
XXVII
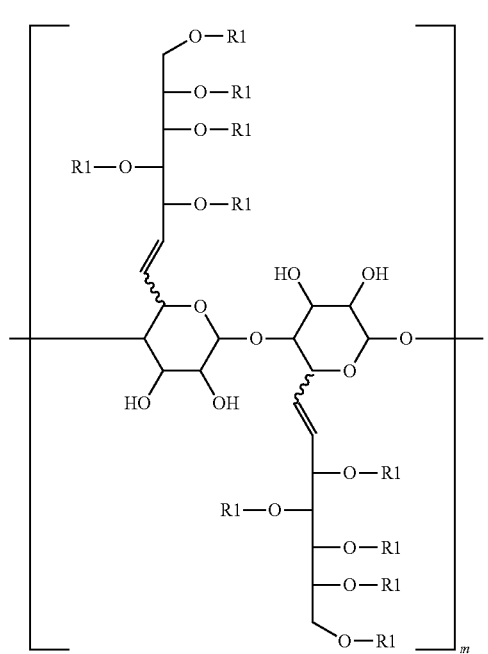
XXVIII
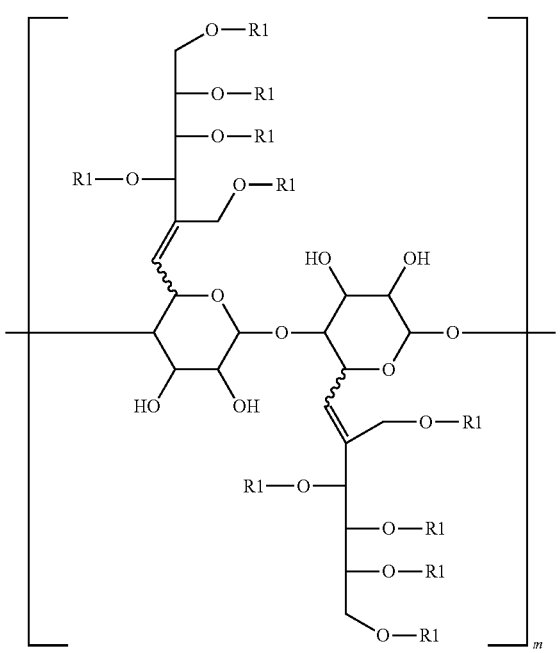
XXIX
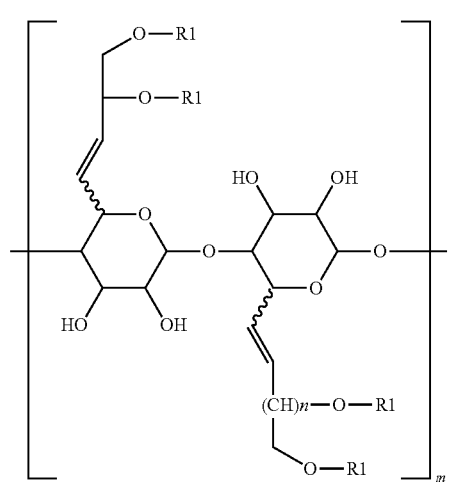
XXX

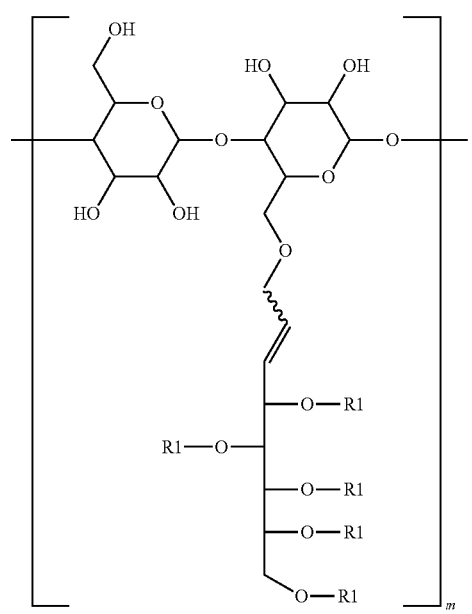
XXXI
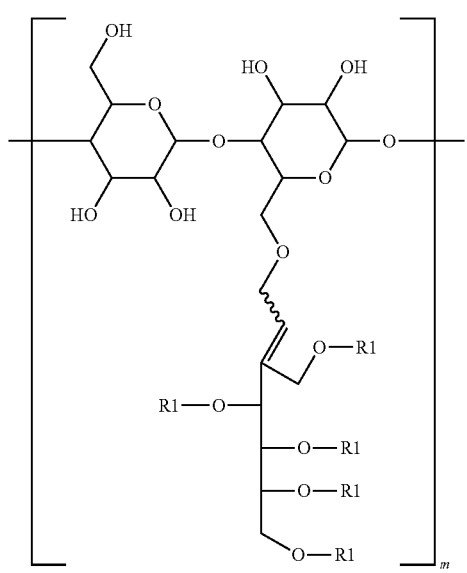
XXXII
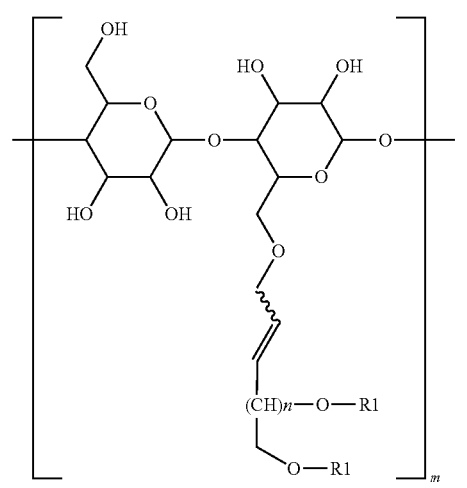
XXXIII
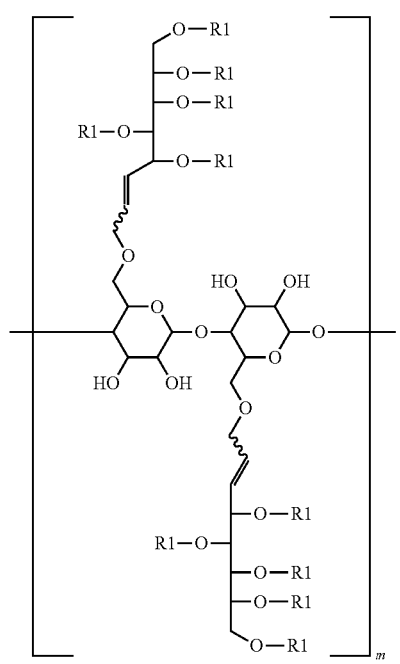
XXXIV
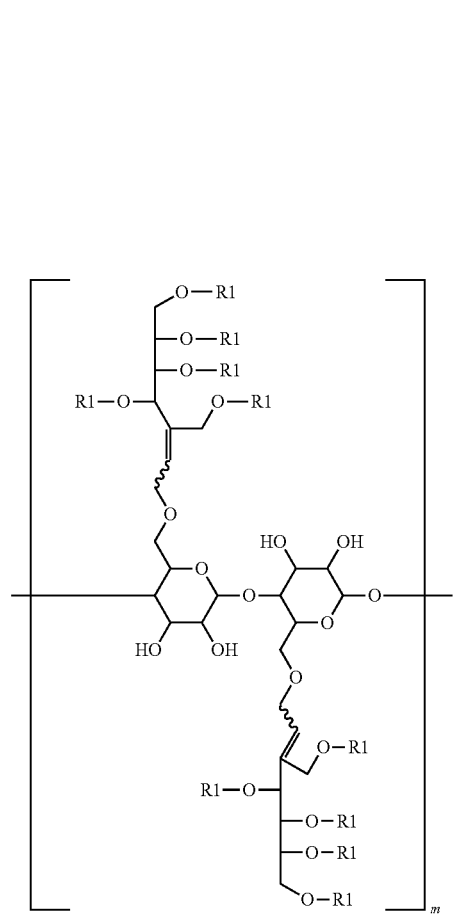
XXXV

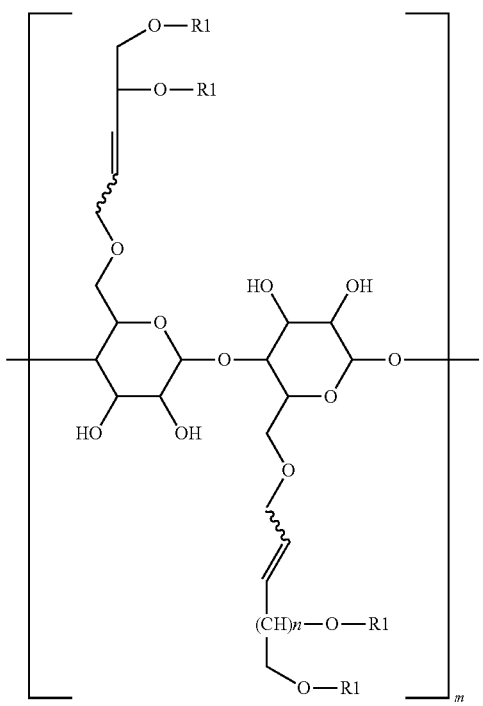

wherein:
m is an integer from 100 to 100,000;
n is an integer from 1-10; and
each $R_1$ is independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted arylalkyl, and substituted or unsubstituted heteroarylalkyl.

2. The polymer of claim 1, wherein said structural repeat unit comprises at least 50% by weight of said polymer.

3. The polymer of claim 1, wherein said structural repeat unit comprises at least 80% by weight of said polymer.

4. The polymer of claim 1, wherein, upon reaction with ozone, a non-volatile compound is produced.

5. The polymer of claim 4, wherein the non-volatile compound is a sugar.

6. The polymer of claim 1, wherein, upon reaction with ozone, a compound that emits a scent is produced.

7. The polymer of claim 6, wherein the compound that emits a scent is vanillin.

8. A method of decomposing ozone comprising contacting ozone with the ozone decomposing composition of claim 1.

9. The method of claim 8, wherein said polymer has a weight average molecular weight of 9,000 to 30,000 Daltons.

10. The method of claim 8, wherein, upon reaction with ozone, a non-volatile compound is produced.

11. The method of claim 10, wherein said non-volatile compound is a sugar.

12. The method of claim 8, wherein, upon reaction with ozone, a compound that emits a scent is produced.

13. The method of claim 12, wherein the compound that emits a scent is vanillin.

14. A coating comprising a solvent and the ozone decomposing polymer of claim 1.

15. The coating of claim 14, wherein said coating is a spray coating.

16. A composition selected from the group consisting of an item of clothing, a fabric, a carpet, a paint, a sealant, a finish, an air-filter, a face-mask, a cosmetic, a cream, a lotion, and a coating, wherein the composition incorporates the ozone decomposing polymer of claim 1.

17. The composition of claim 16, which is an air-filter.

18. The composition of claim 16, selected from the group consisting of a cosmetic, a cream, and a lotion.

* * * * *